Figure 37A:
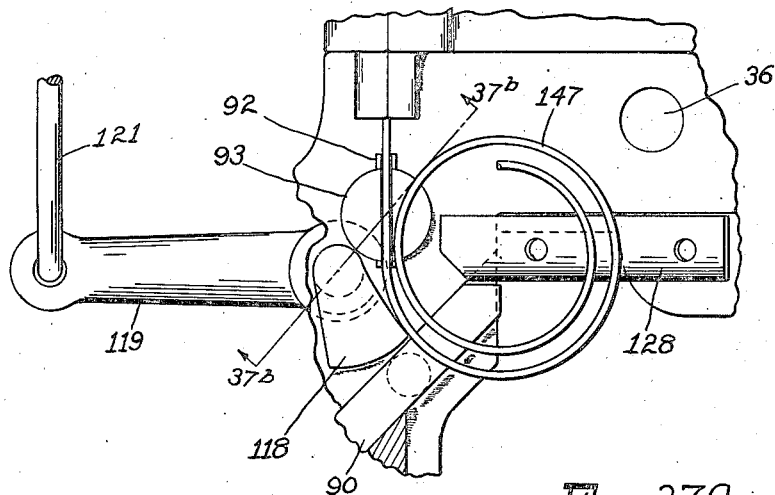

Jan. 15, 1924.
B. L. VAN ORMAN
1,480,796
WIRE SPRING MAKING MACHINE
Filed June 2, 1921  35 Sheets-Sheet 1
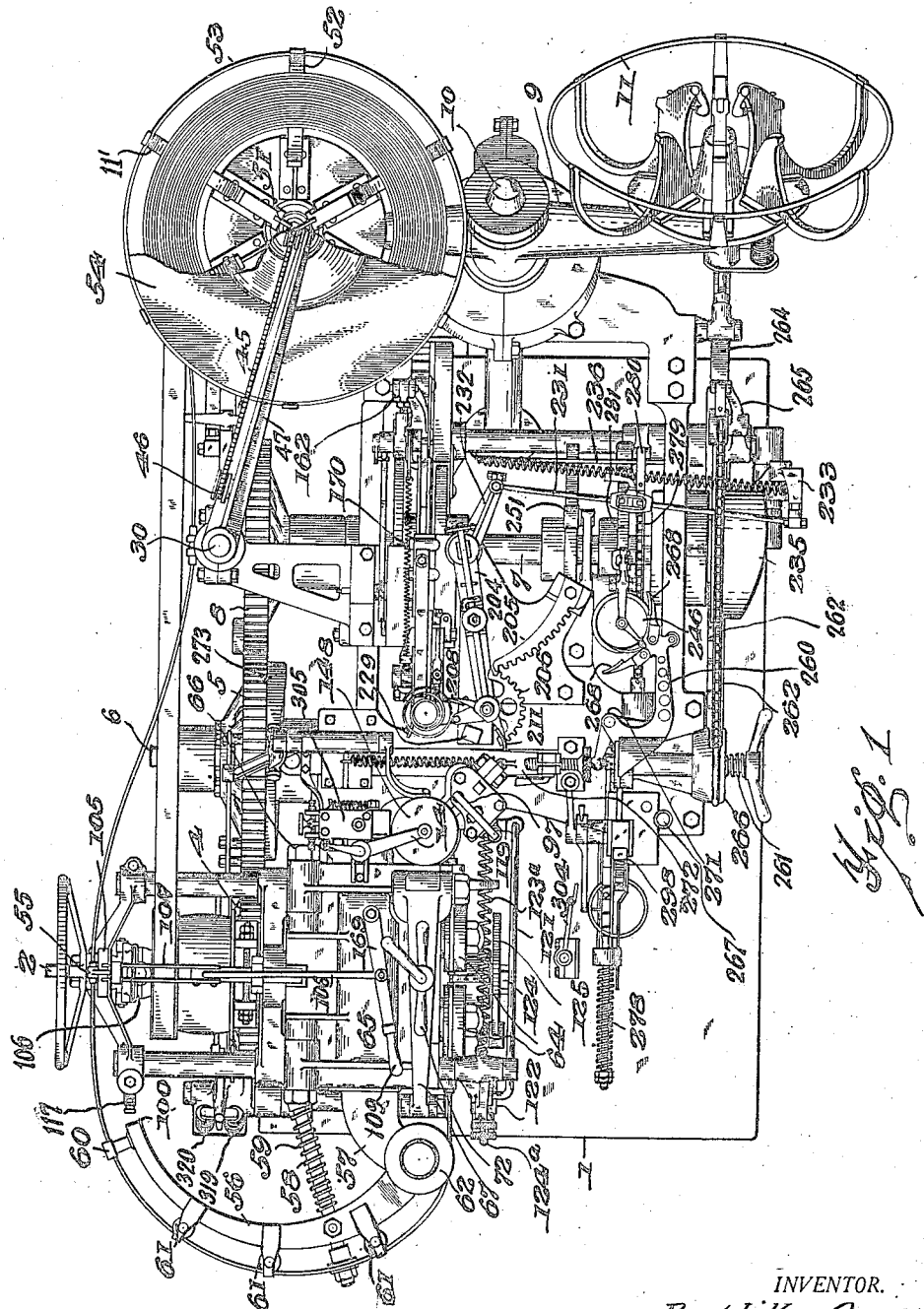
INVENTOR.
Bert L. Van Orman
BY
ATTORNEY.

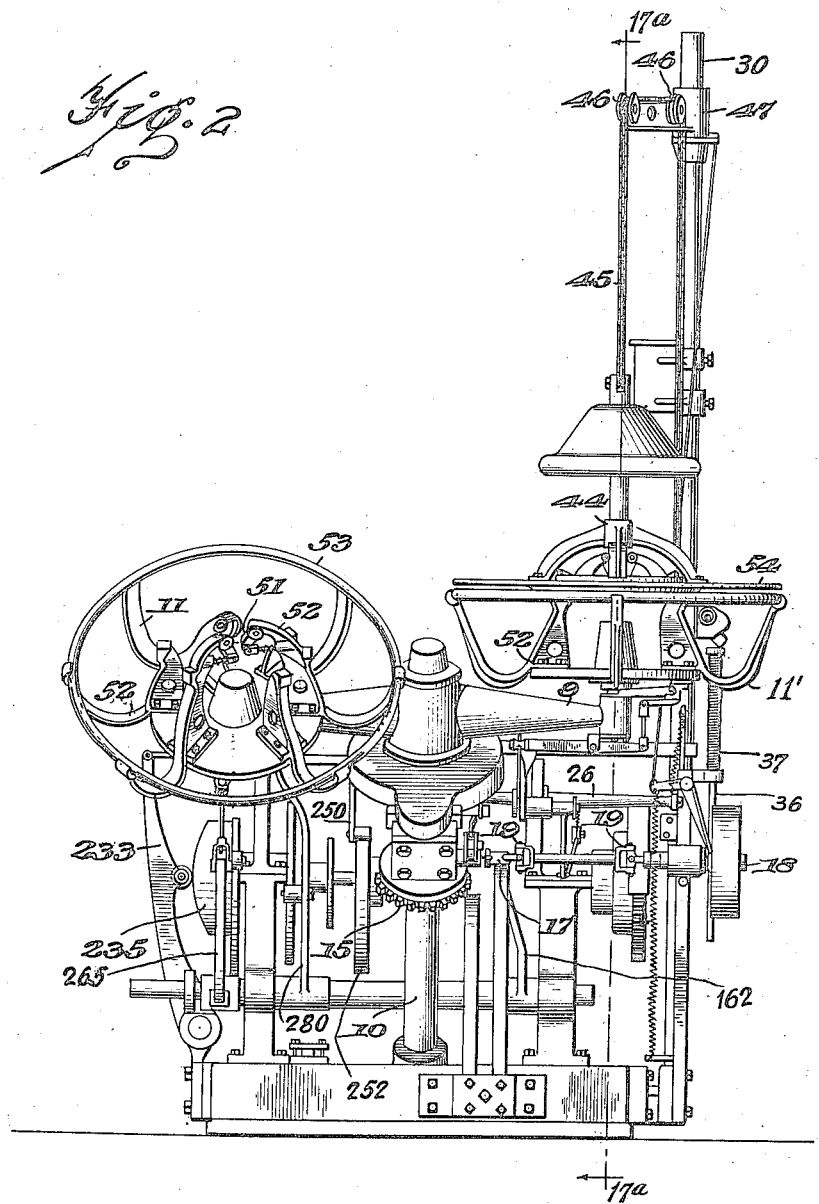

Jan. 15, 1924.
B. L. VAN ORMAN
1,480,796
WIRE SPRING MAKING MACHINE
Filed June 2, 1921    35 Sheets-Sheet 3
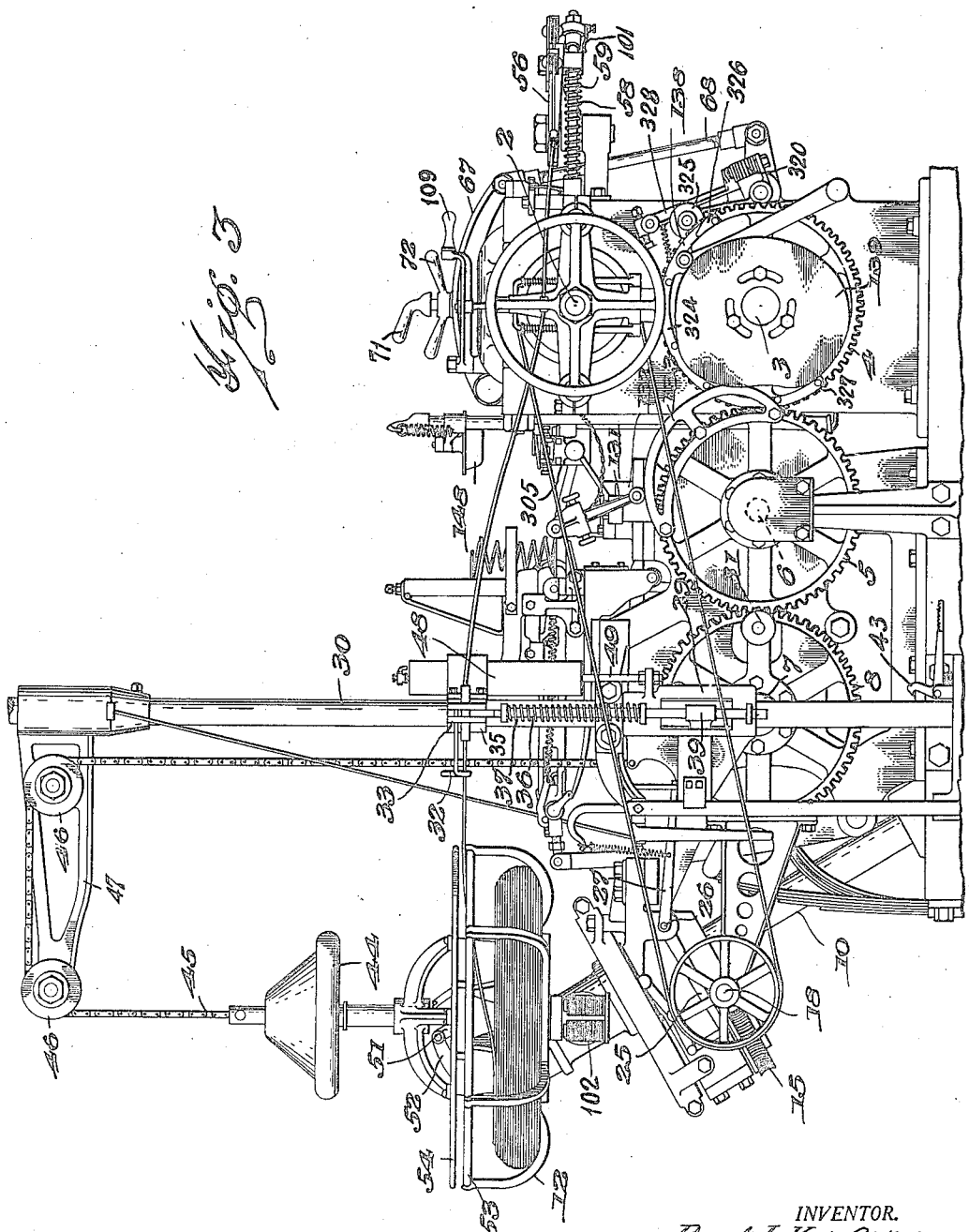
INVENTOR.
Bert L. Van Orman
BY
Clement P. Stickney
ATTORNEY.

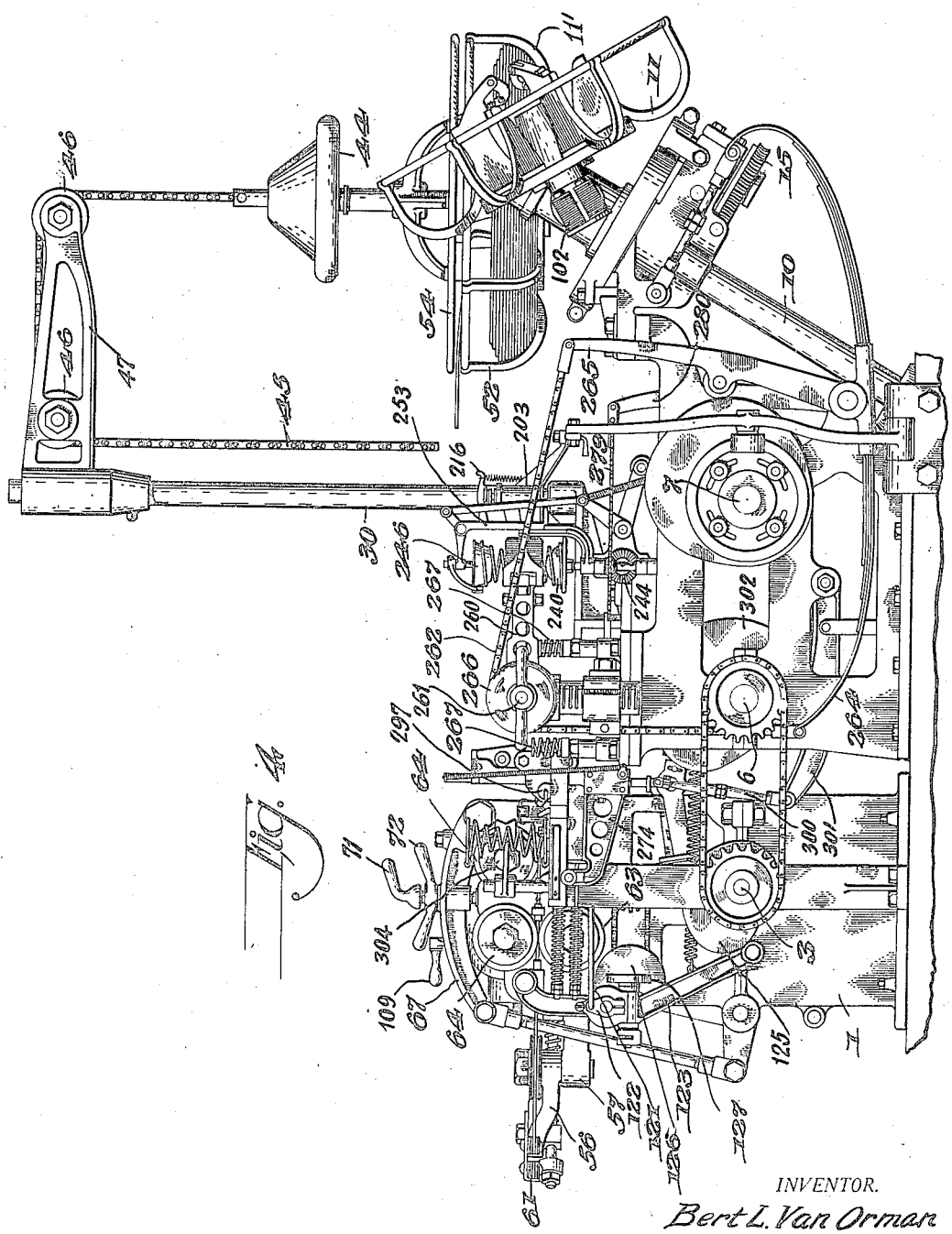

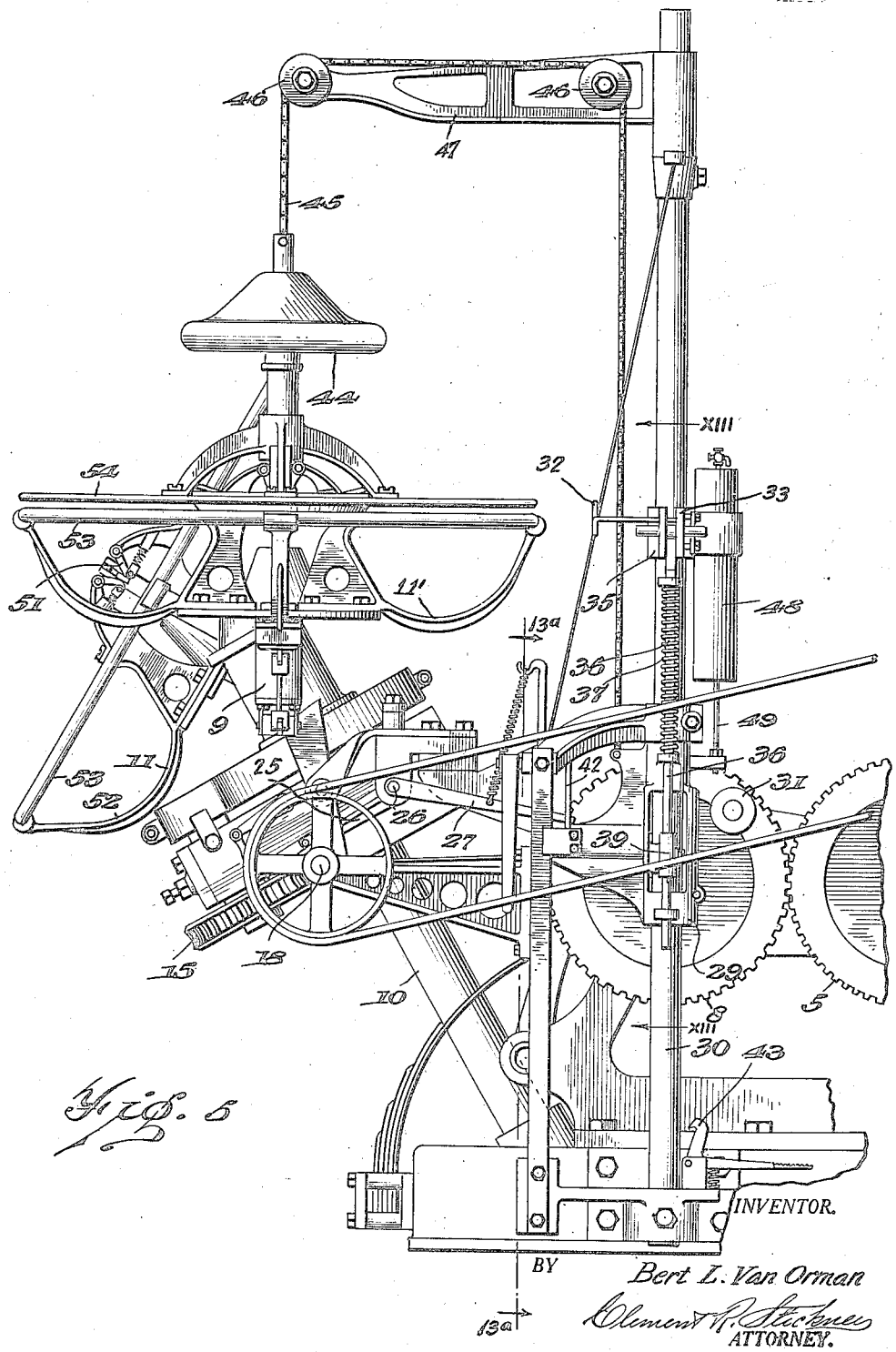

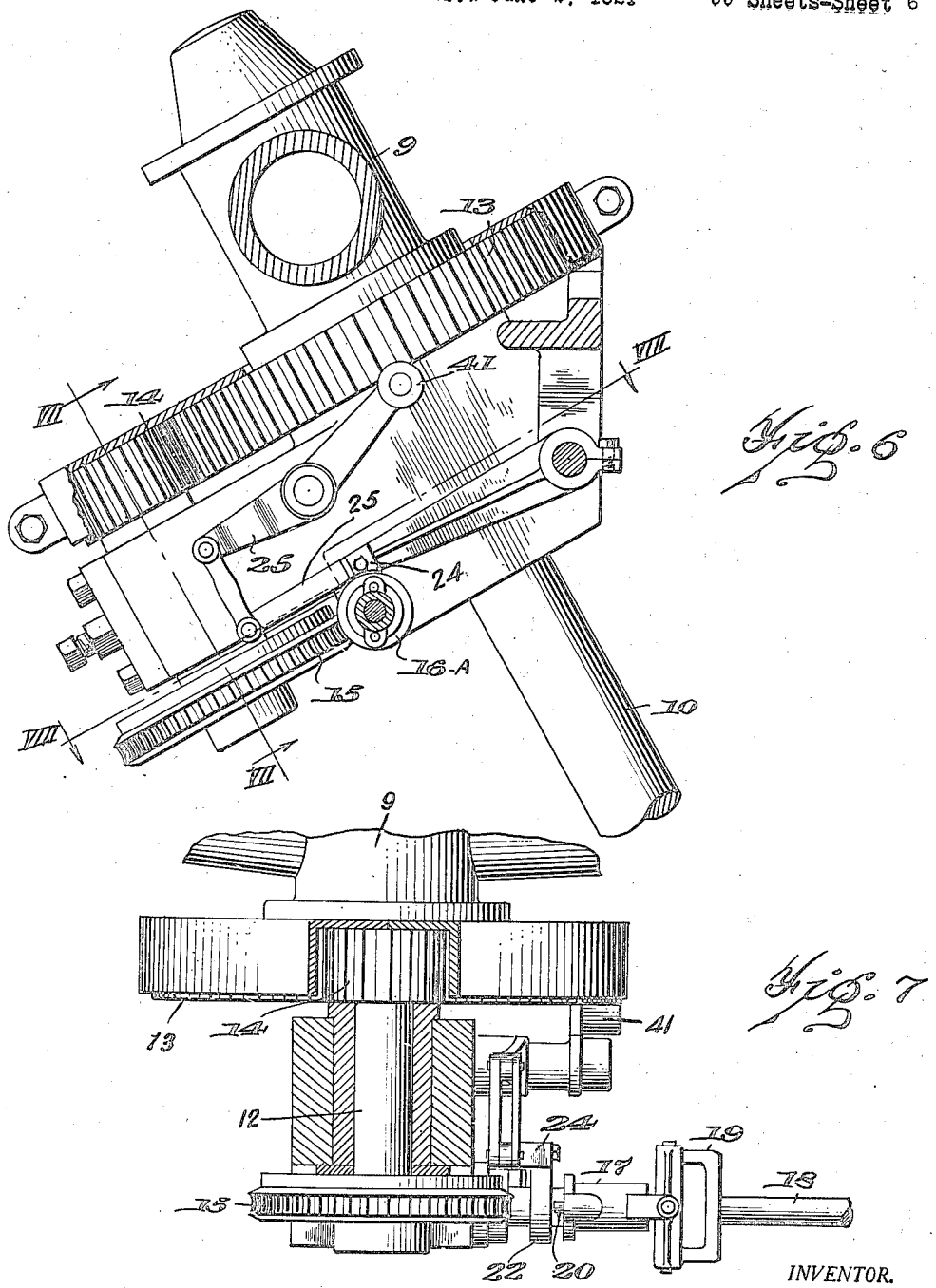

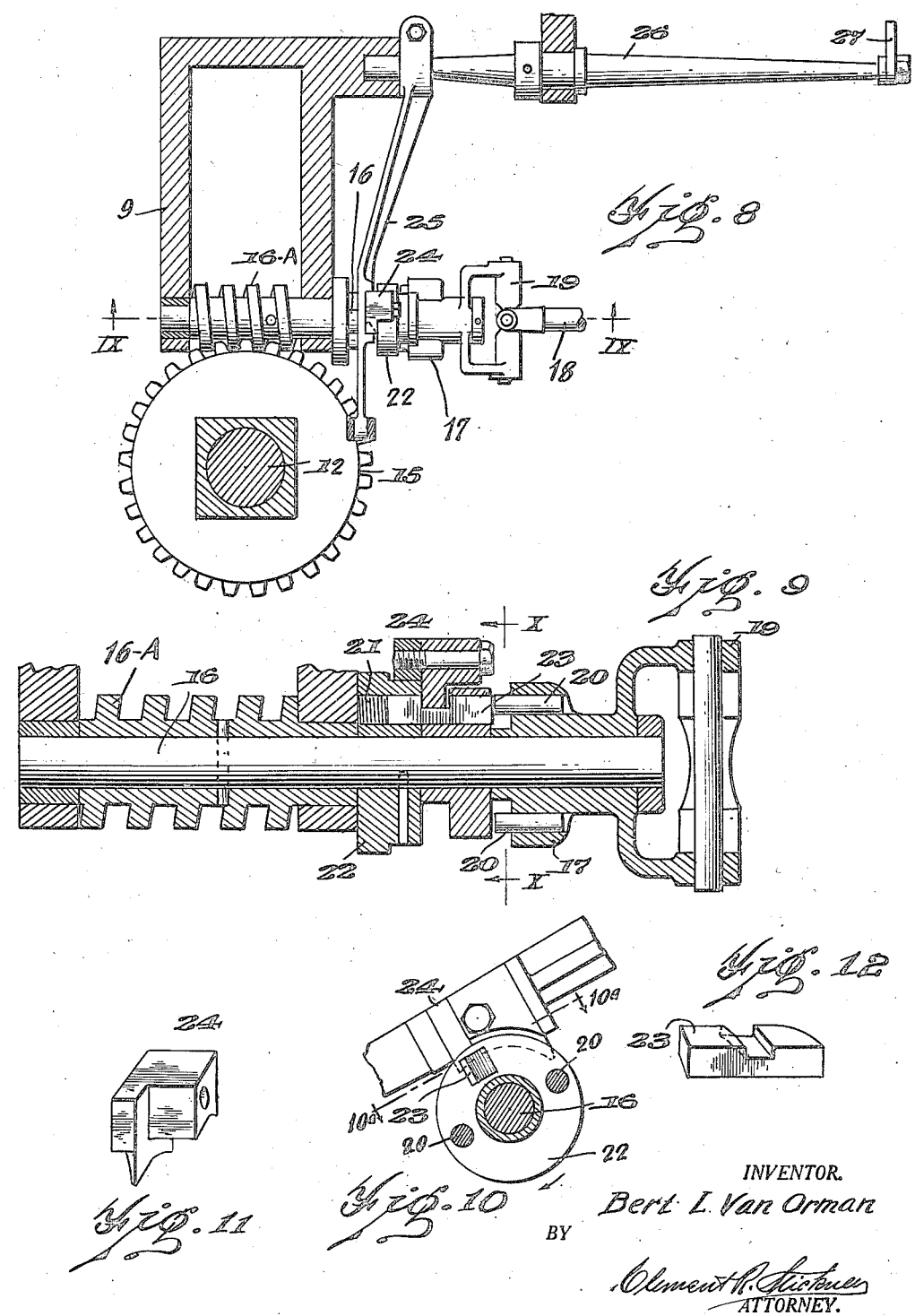

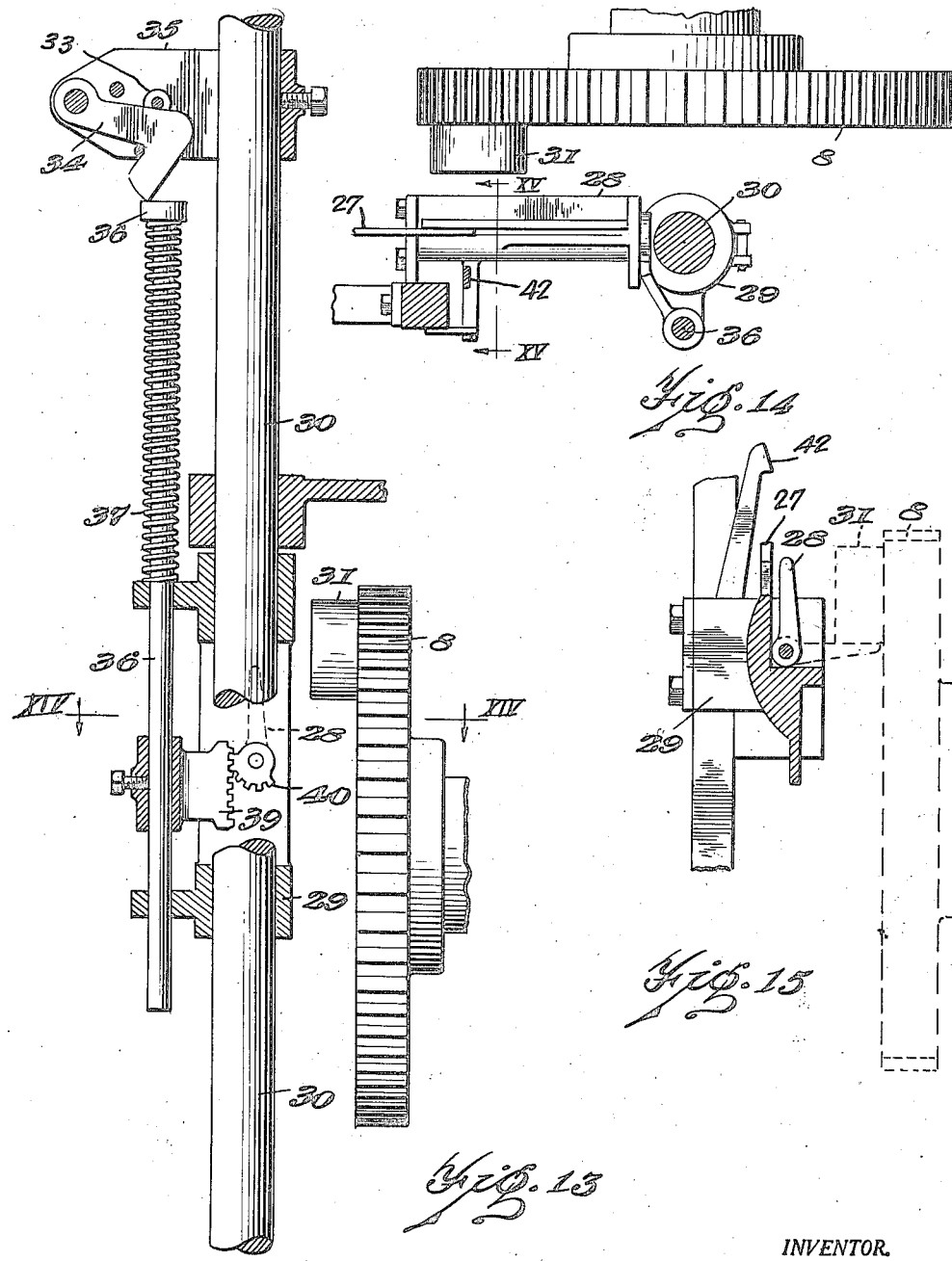

Jan. 15, 1924.
B. L. VAN ORMAN
1,480,796
WIRE SPRING MAKING MACHINE
Filed June 2, 1921   35 Sheets-Sheet 9
Fig. 16
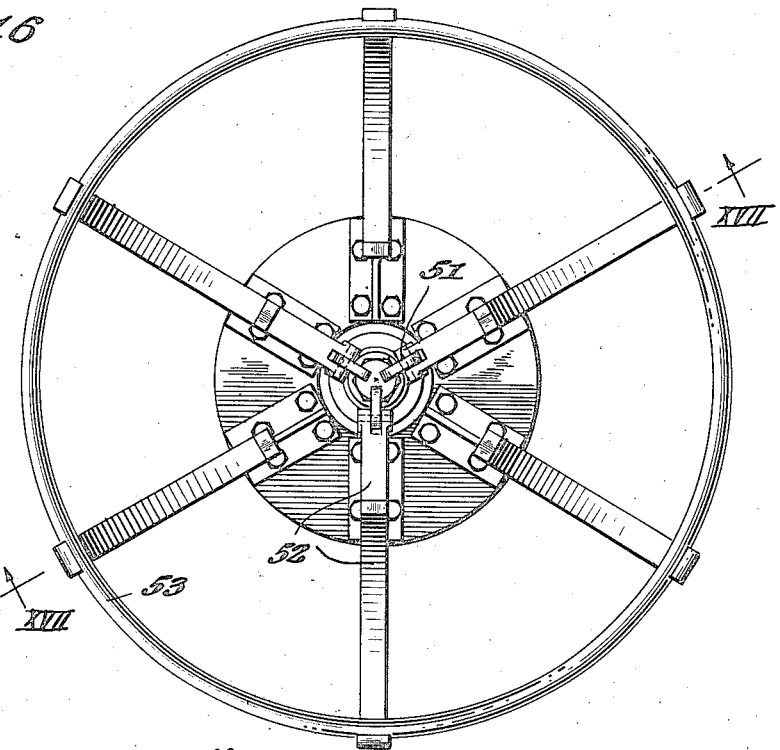
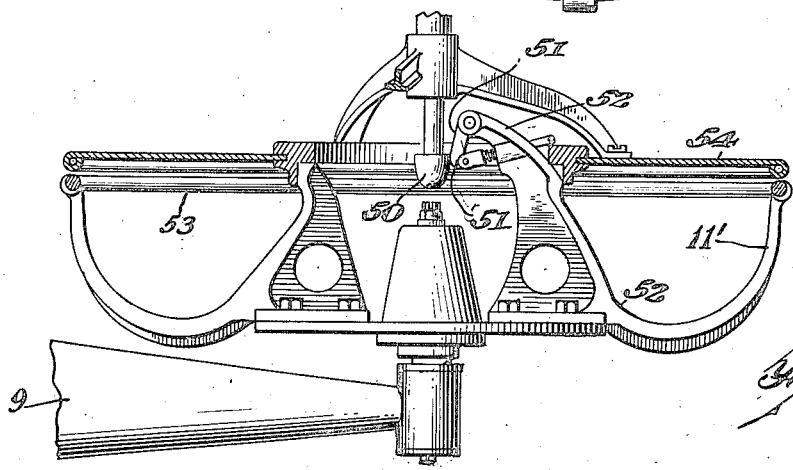
Fig. 17
INVENTOR.
Bert L. Van Orman
BY
Clement P. Stickney
ATTORNEY.

Jan. 15, 1924.   B. L. VAN ORMAN   1,480,796
WIRE SPRING MAKING MACHINE
Filed June 2, 1921   35 Sheets-Sheet 10
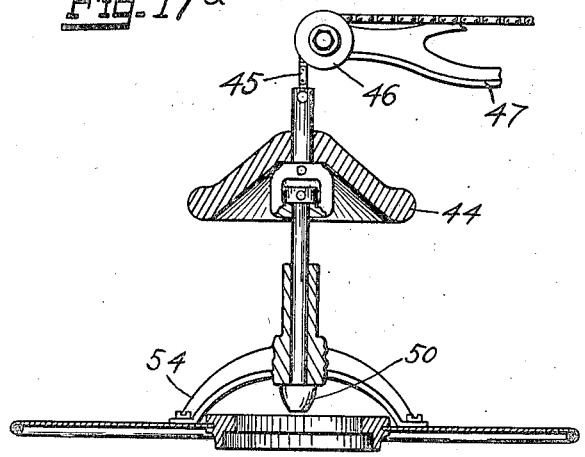
Fig. 17ª
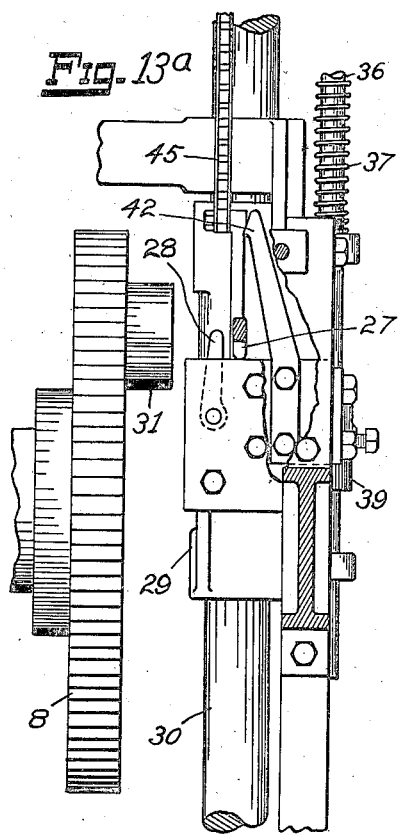
Fig. 13ª
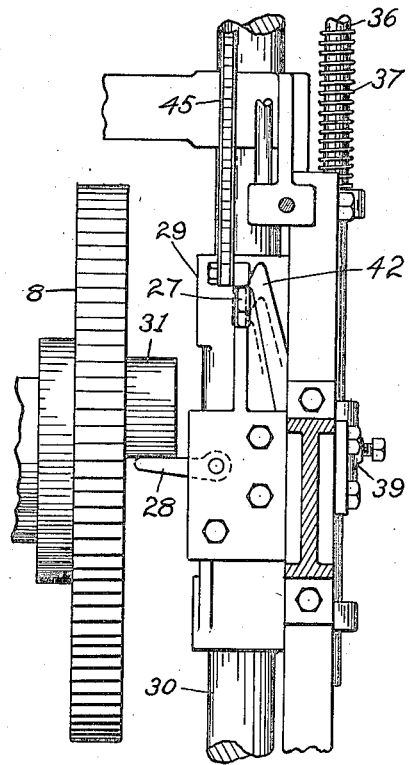
Fig. 13ᵇ
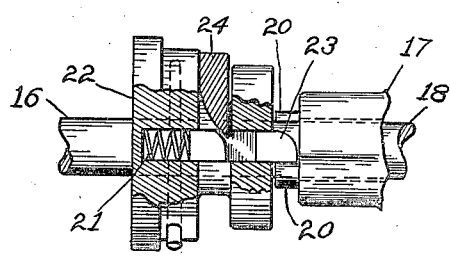
Fig. 10ª
INVENTOR.
Bert L. Van Orman
BY
Chappell & Earl
ATTORNEYS

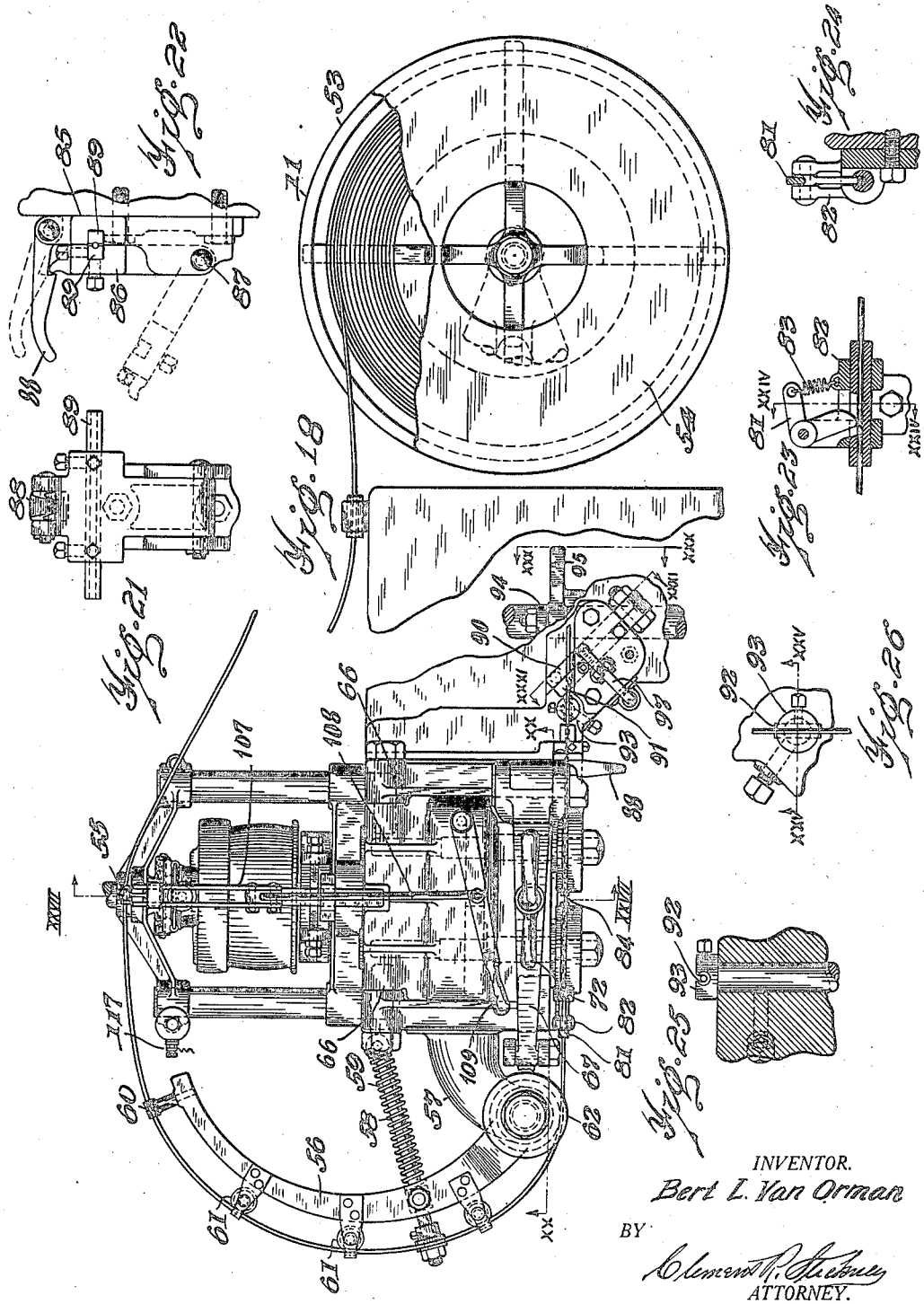

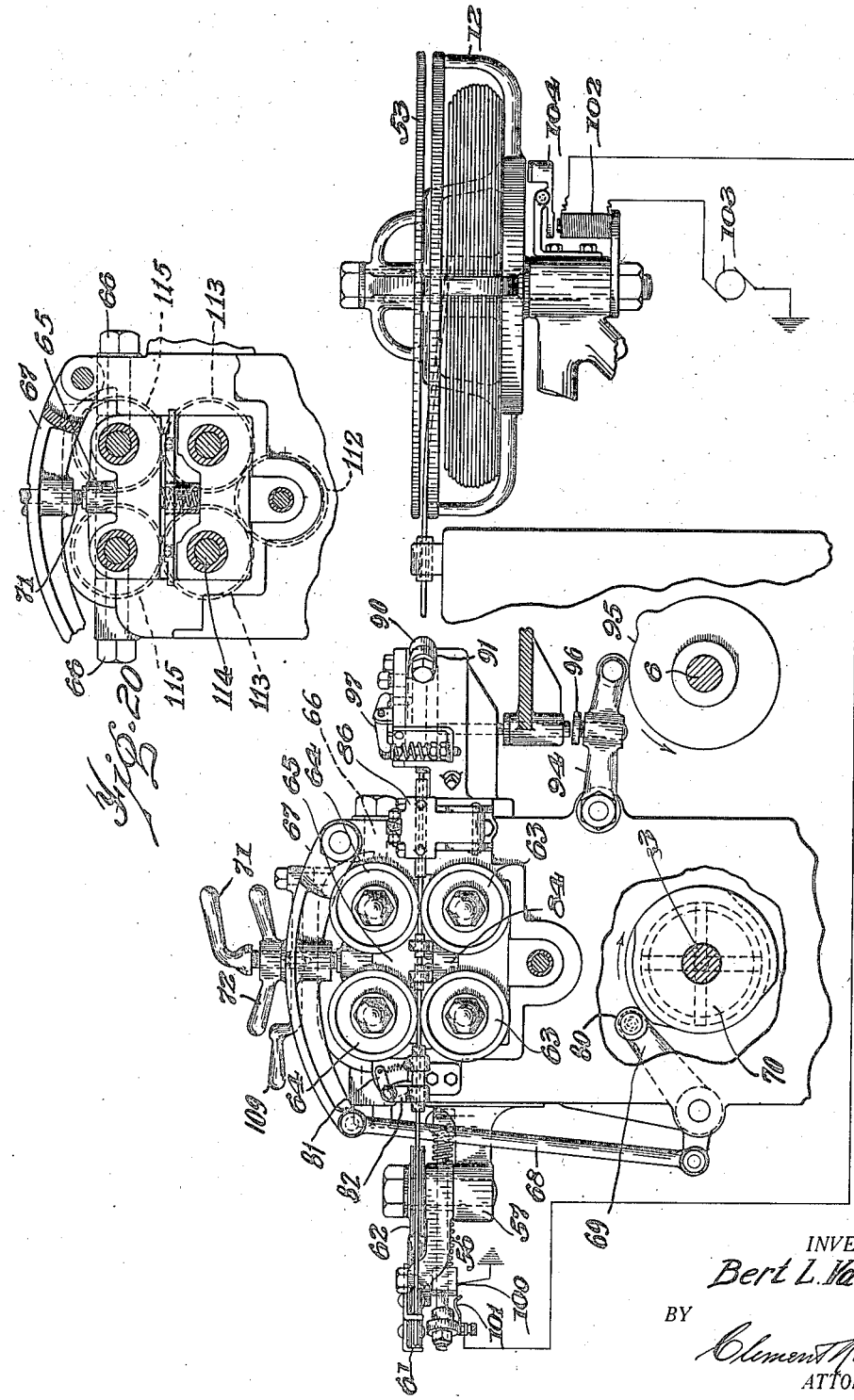

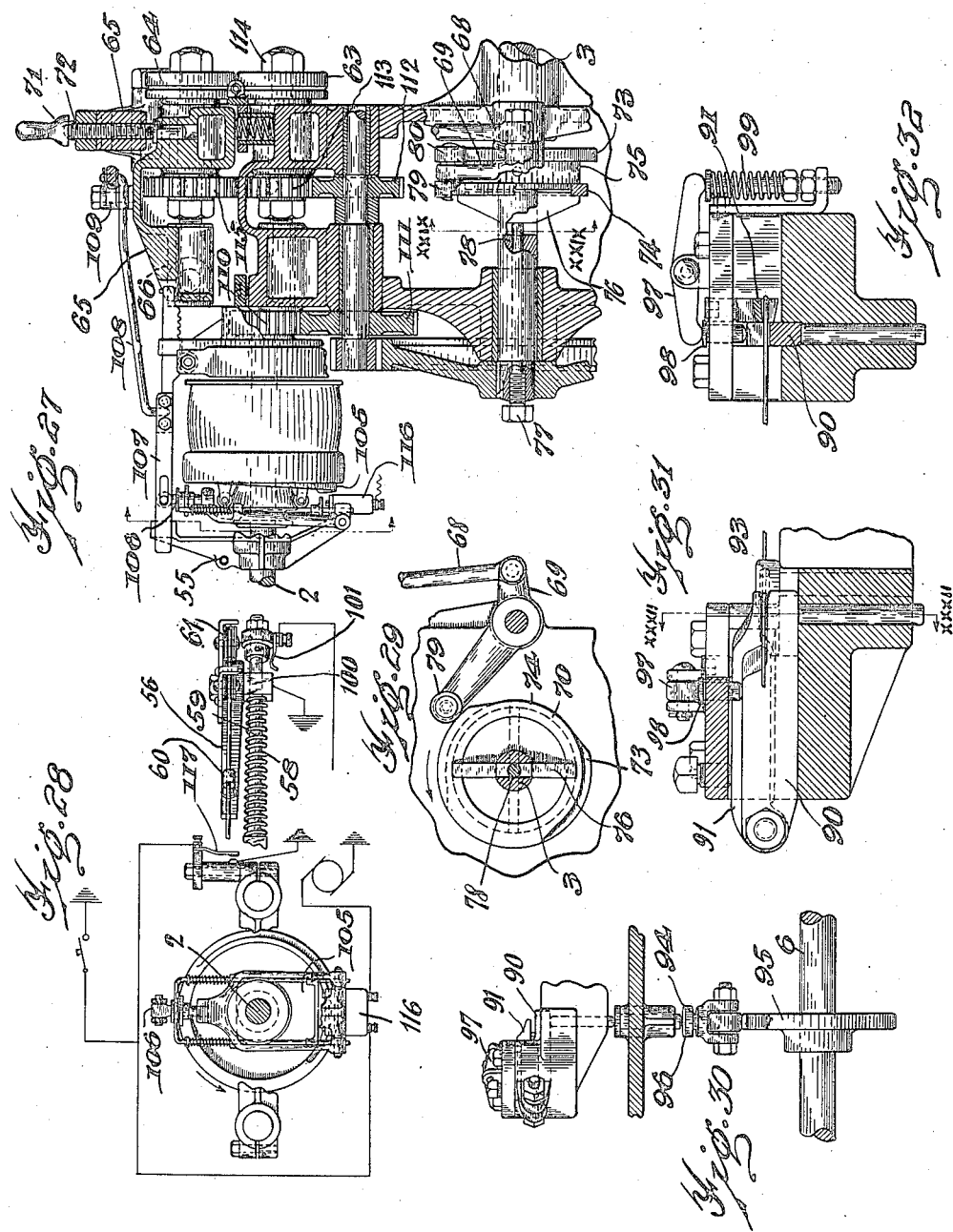

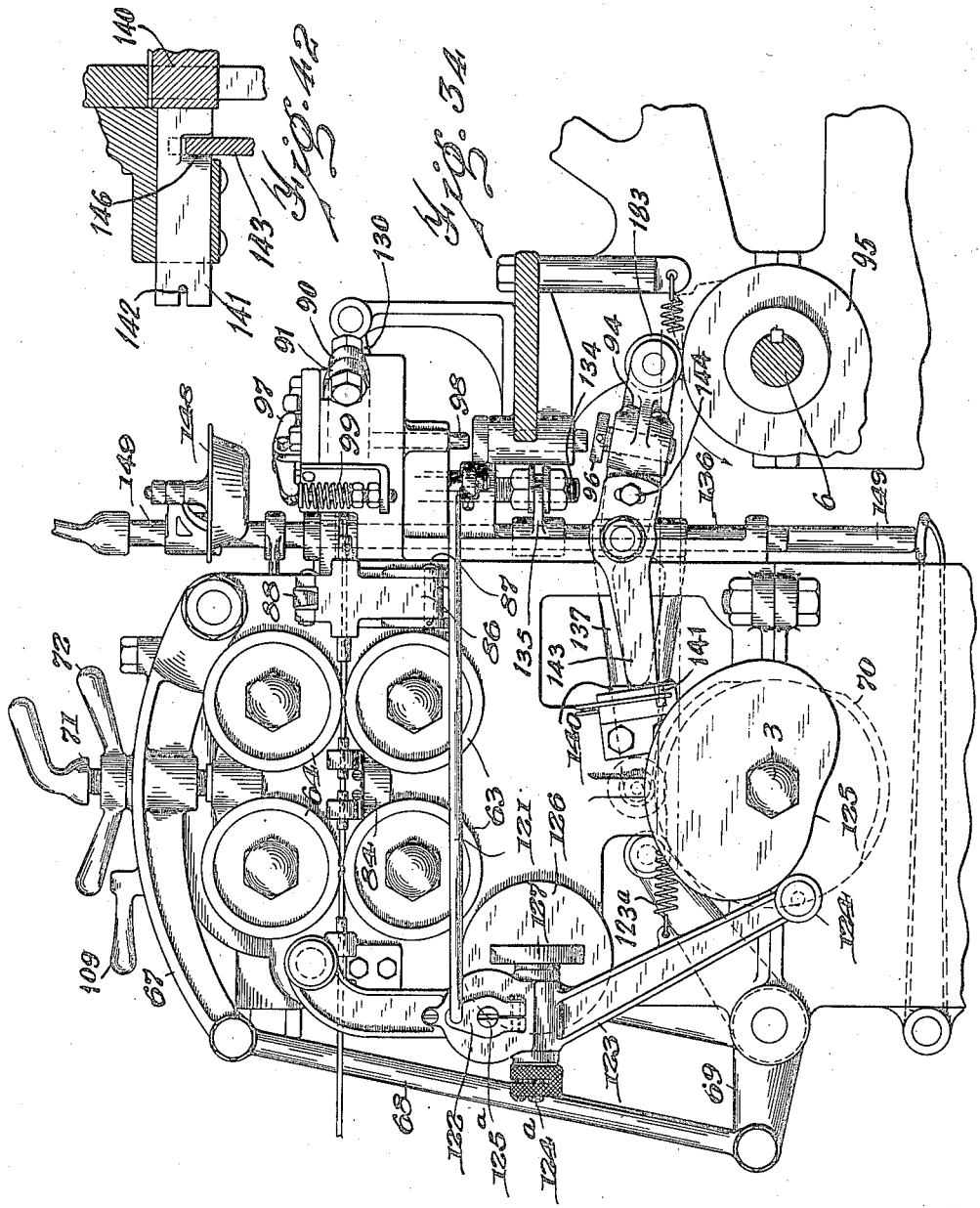

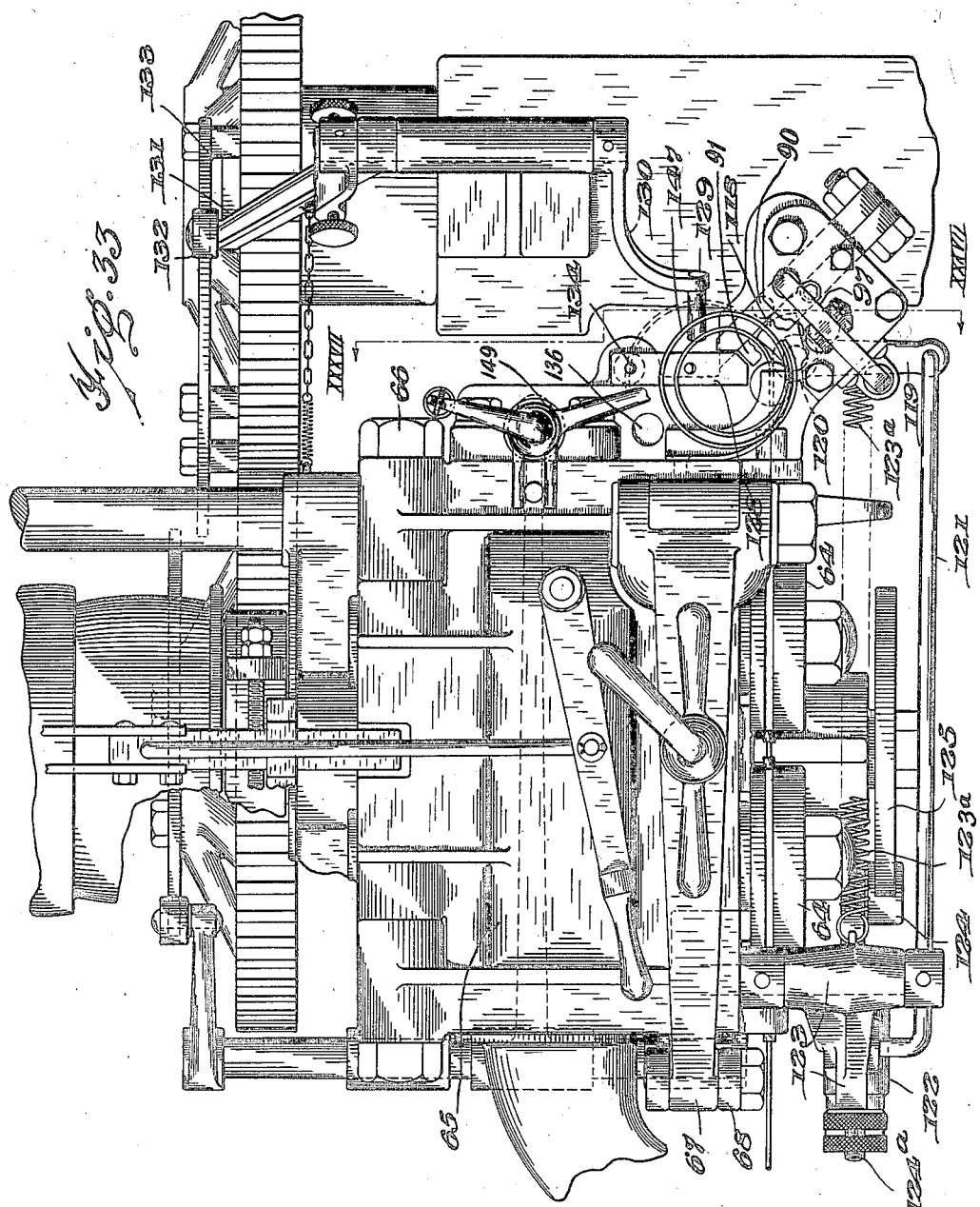

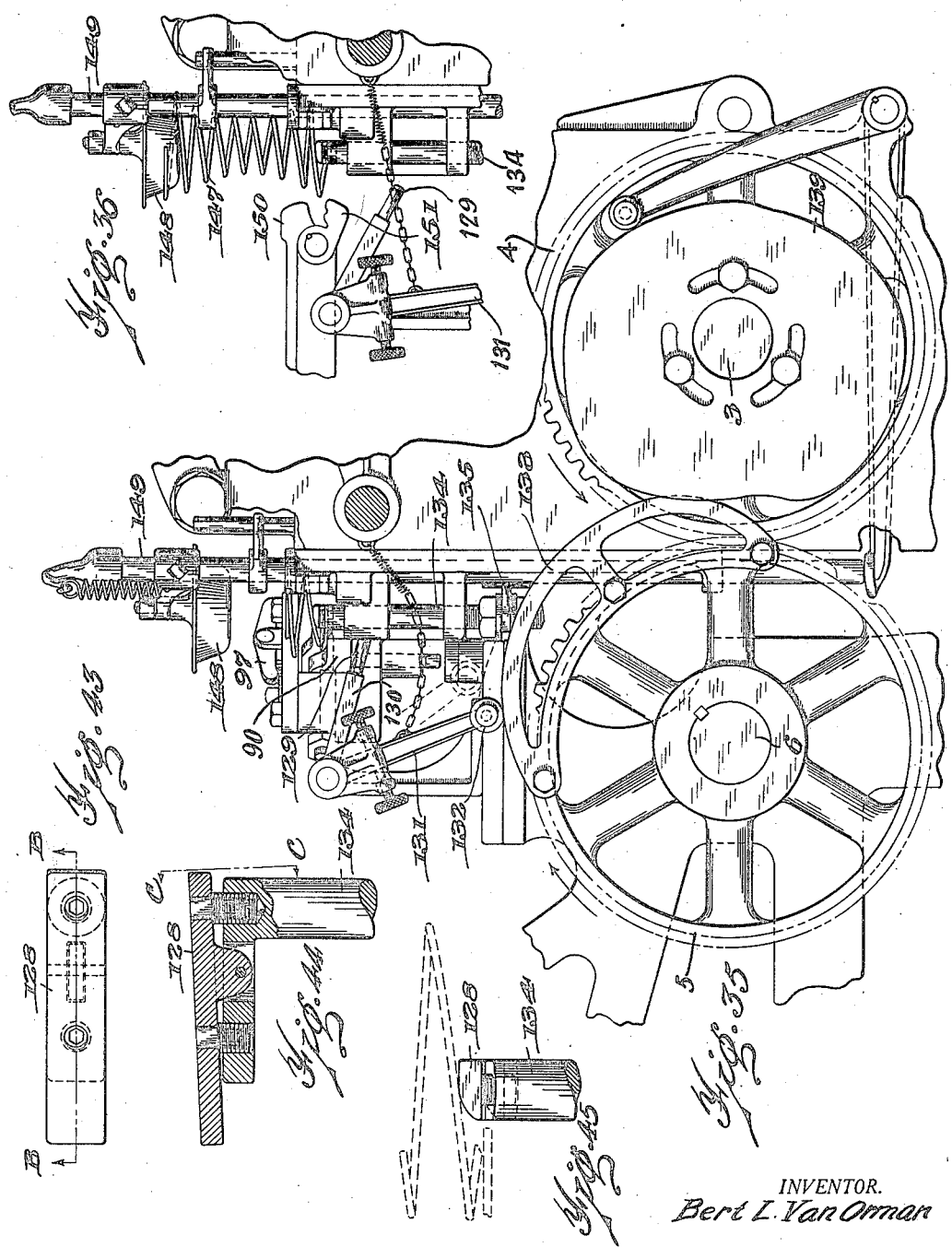

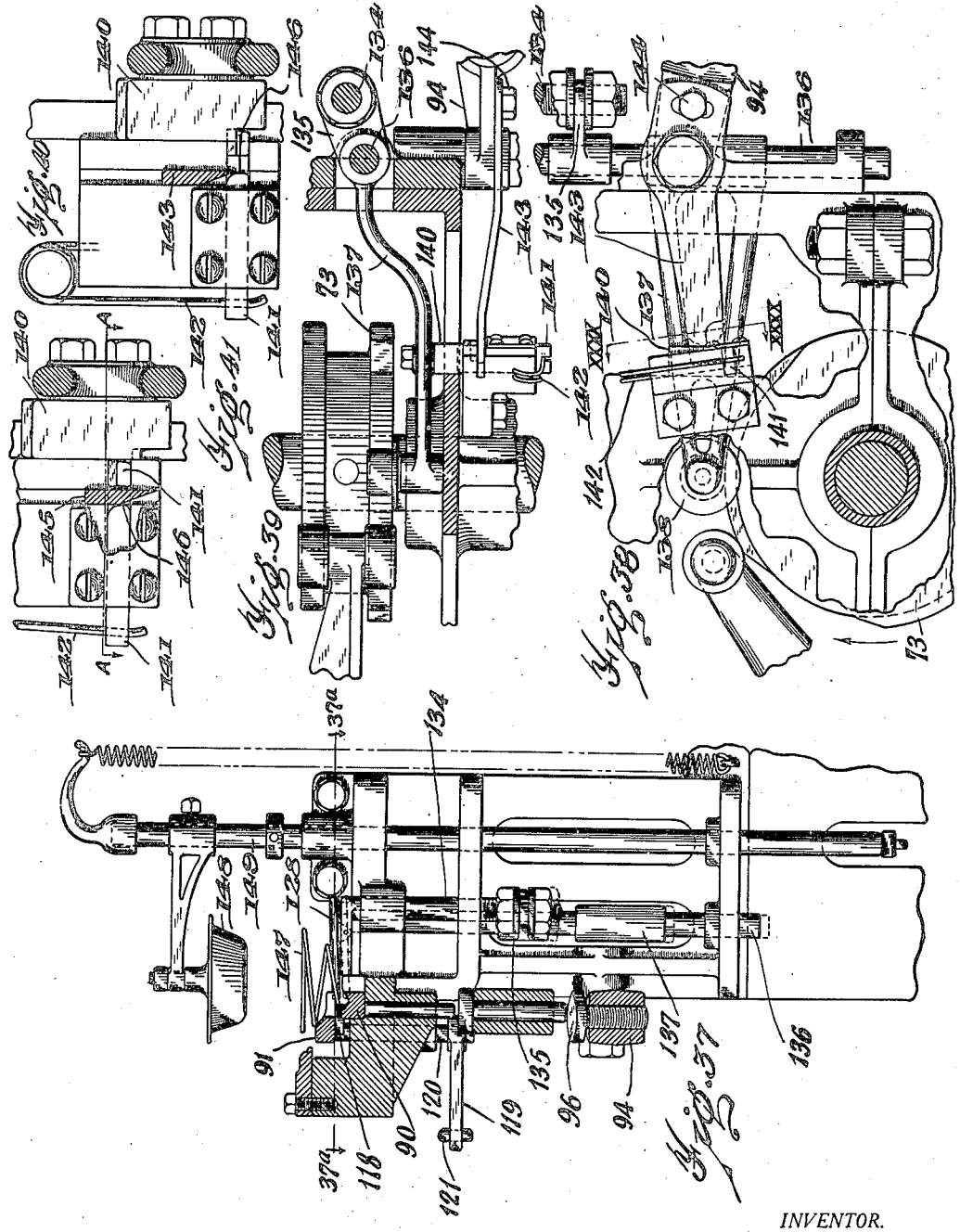

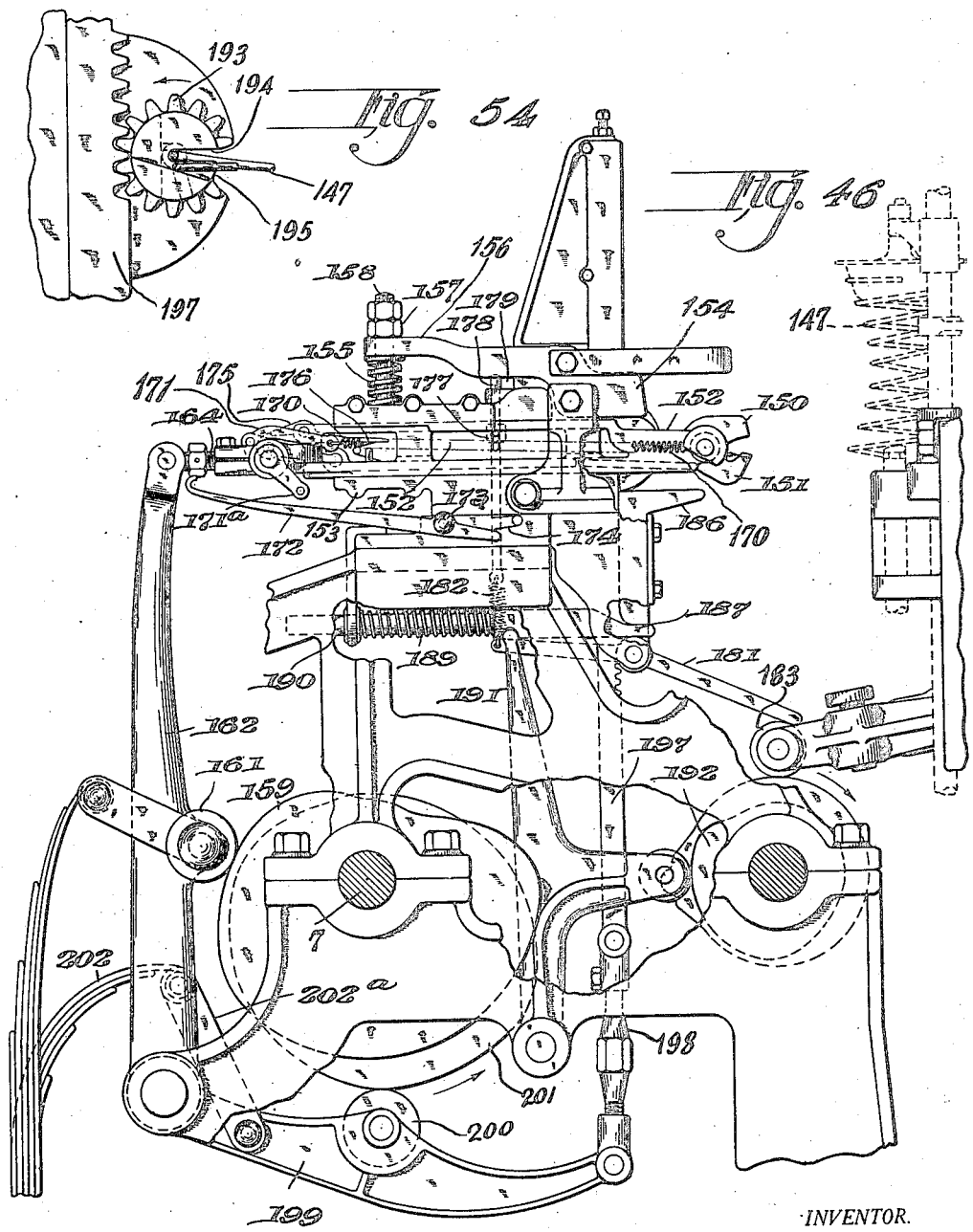

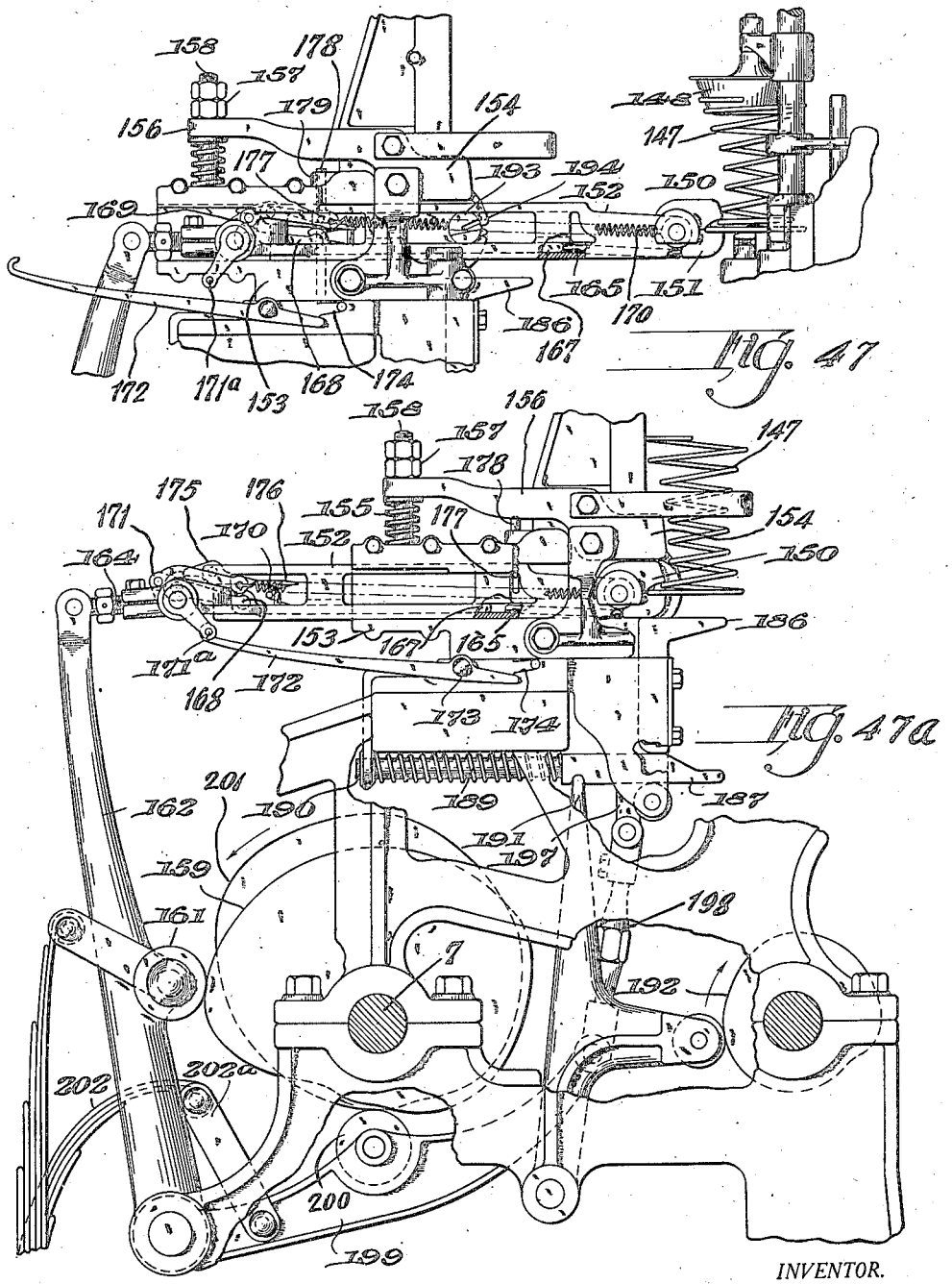

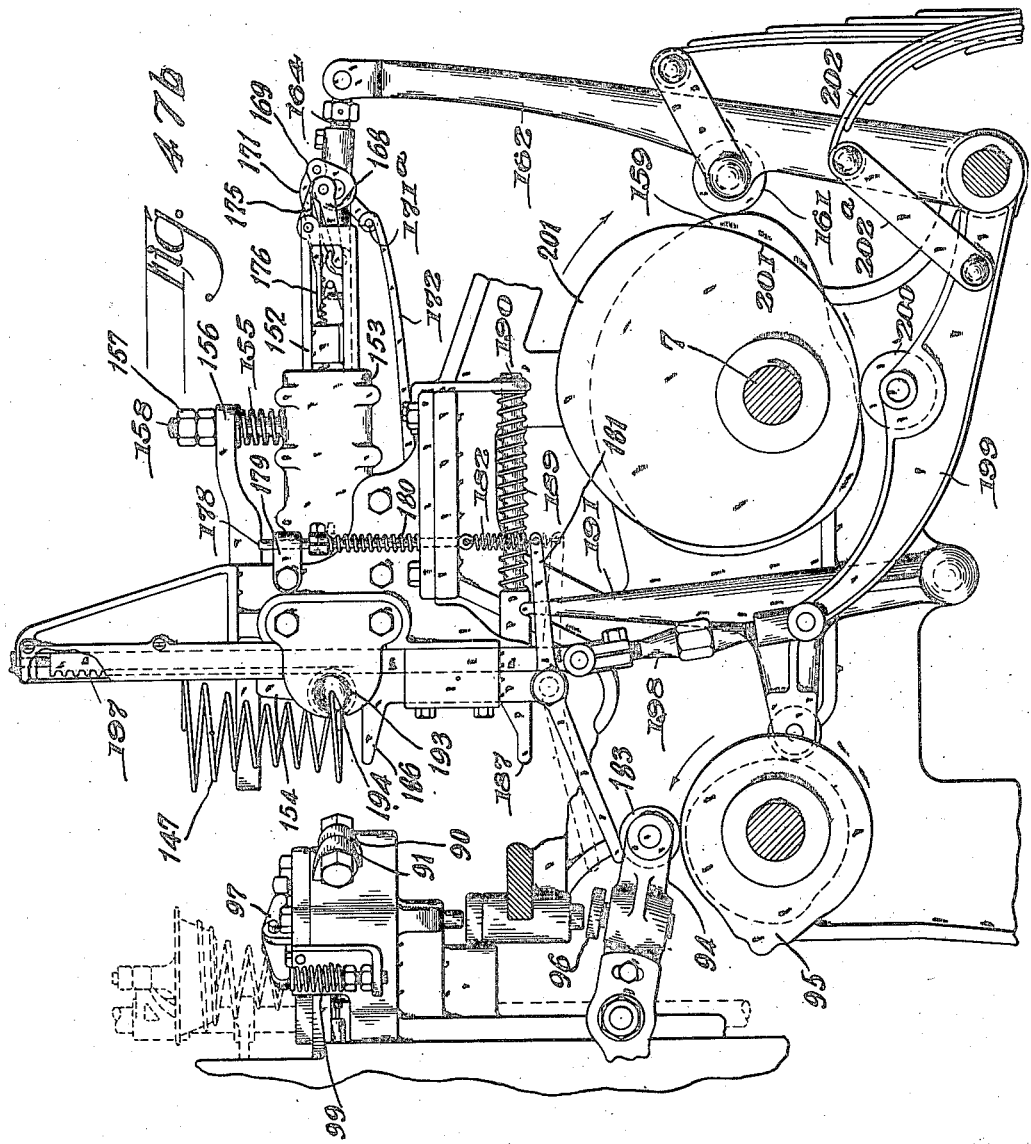

Jan. 15, 1924. 1,480,796
B. L. VAN ORMAN
WIRE SPRING MAKING MACHINE
Filed June 2, 1921    35 Sheets-Sheet 22
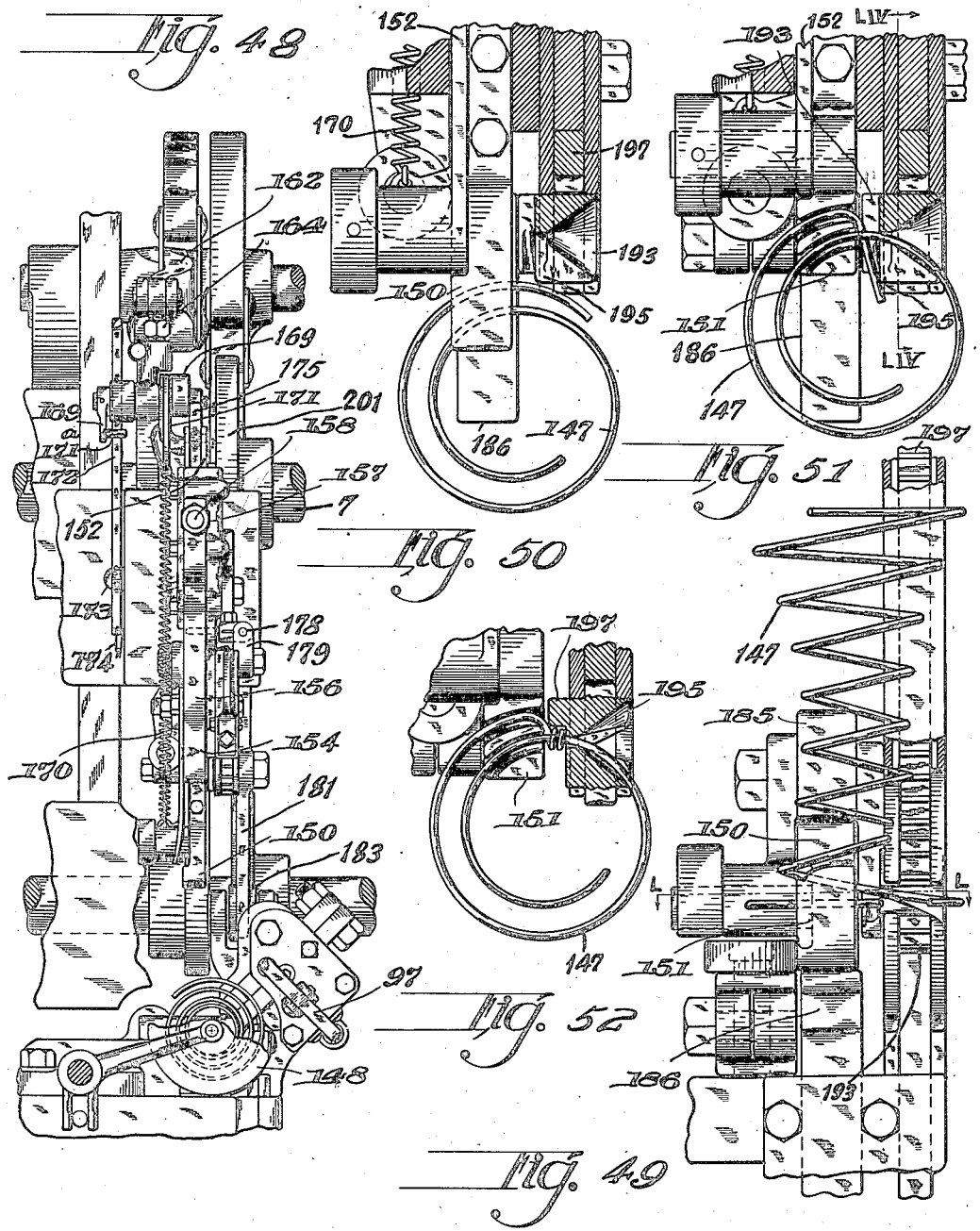
INVENTOR.
Bert L. Van Orman
BY
Clement P. Fickens
ATTORNEY.

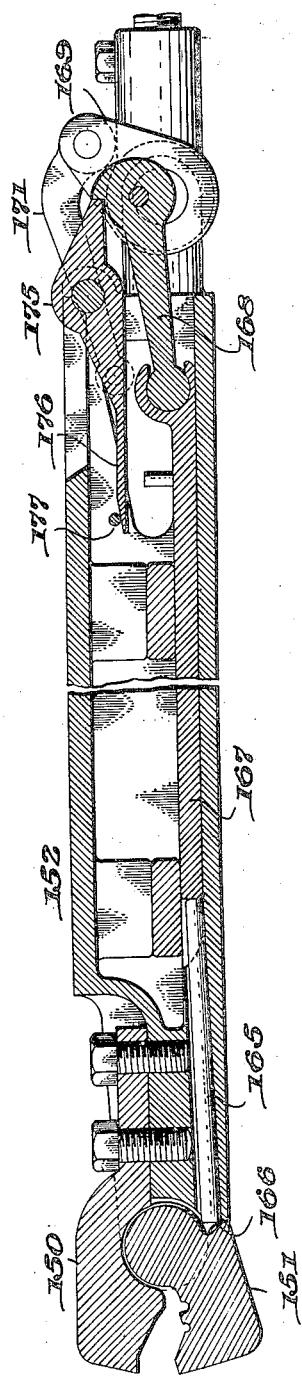

Jan. 15, 1924.  B. L. VAN ORMAN  1,480,796
WIRE SPRING MAKING MACHINE
Filed June 2, 1921    35 Sheets-Sheet 24

INVENTOR.
Bert L. Van Orman
BY
ATTORNEY.

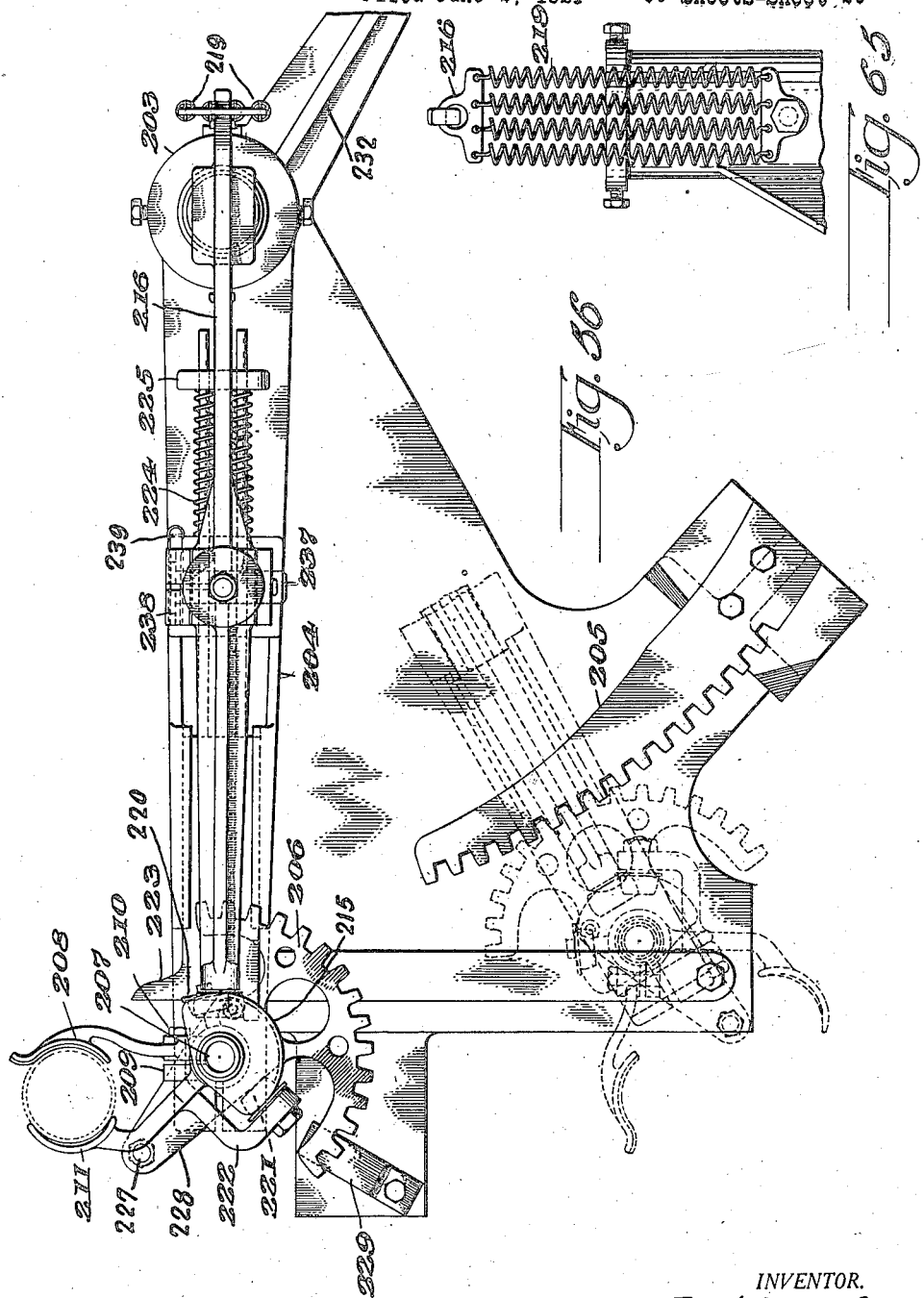

Jan. 15, 1924.
B. L. VAN ORMAN
1,480,796
WIRE SPRING MAKING MACHINE
Filed June 2, 1921    35 Sheets-Sheet 26
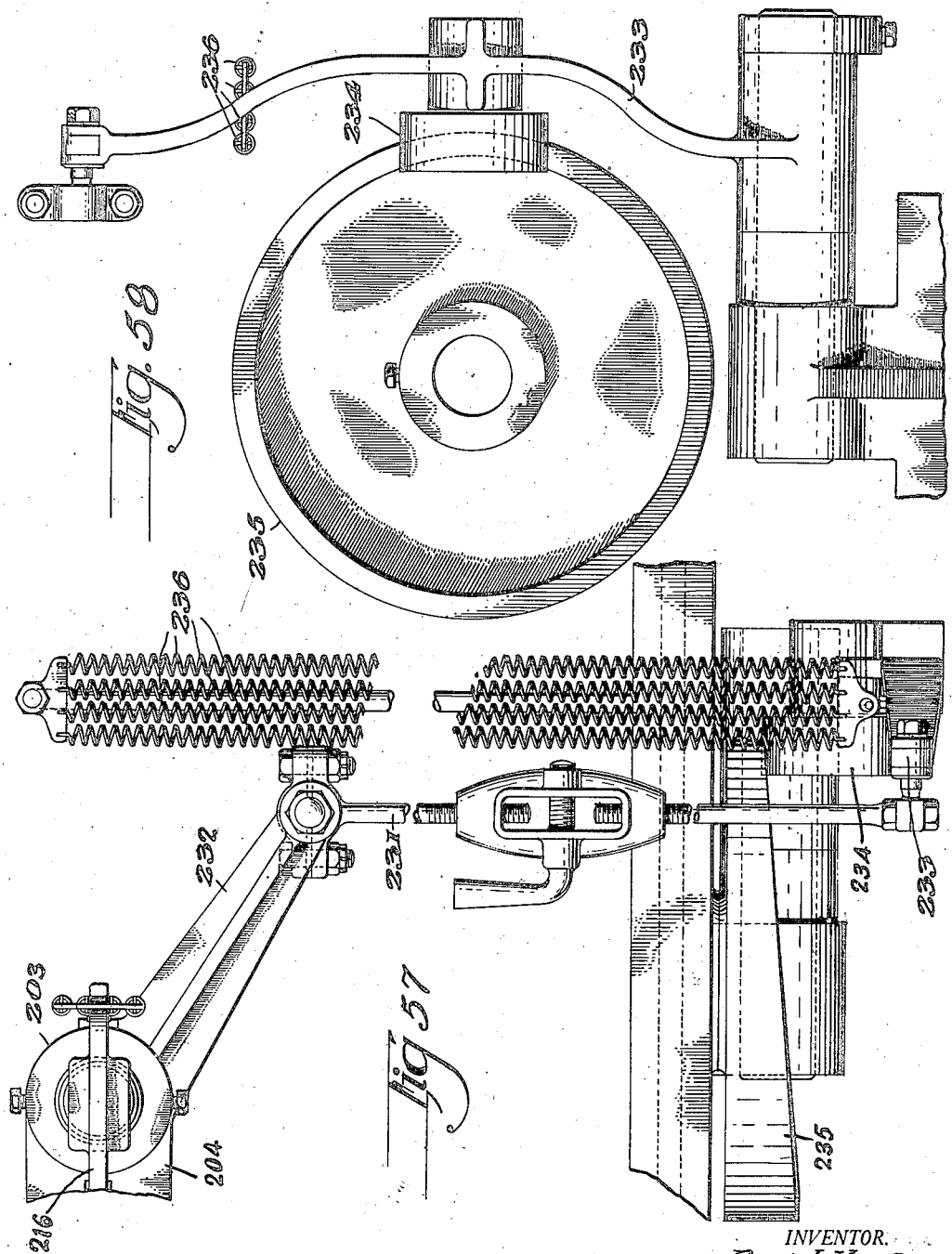
INVENTOR.
Bert L. Van Orman
BY
Clement P. Stickney
ATTORNEY.

Jan. 15, 1924.
B. L. VAN ORMAN
1,480,796
WIRE SPRING MAKING MACHINE
Filed June 2, 1921 35 Sheets-Sheet 27
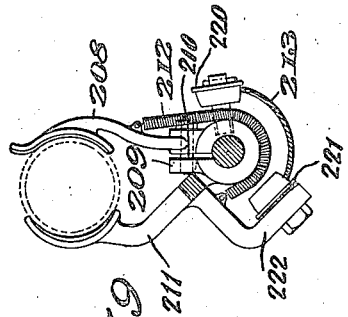
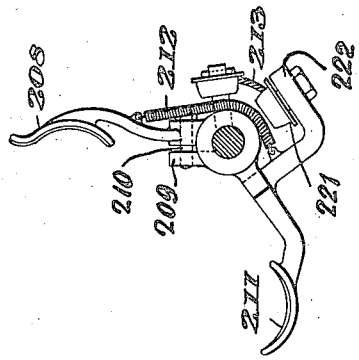
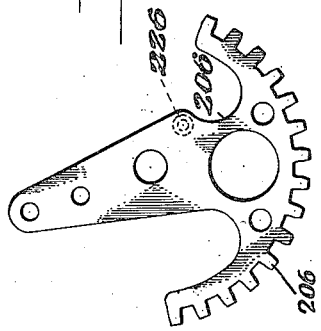
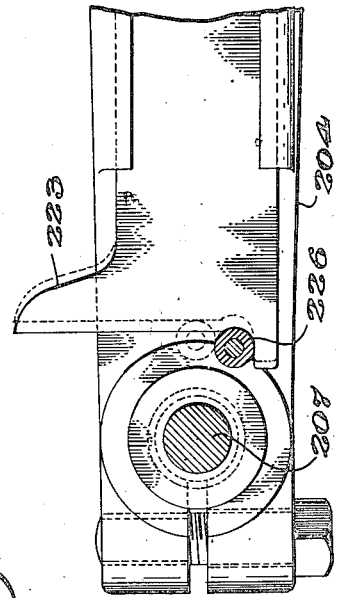
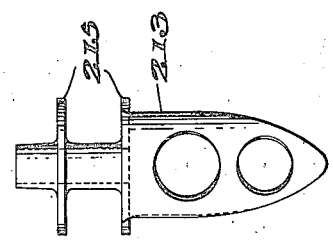
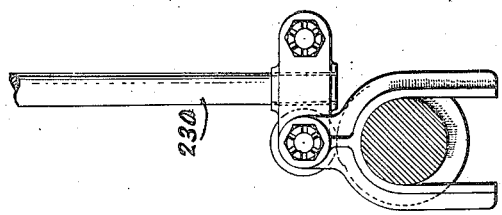
INVENTOR.
Bert L. Van Orman
BY
ATTORNEY.

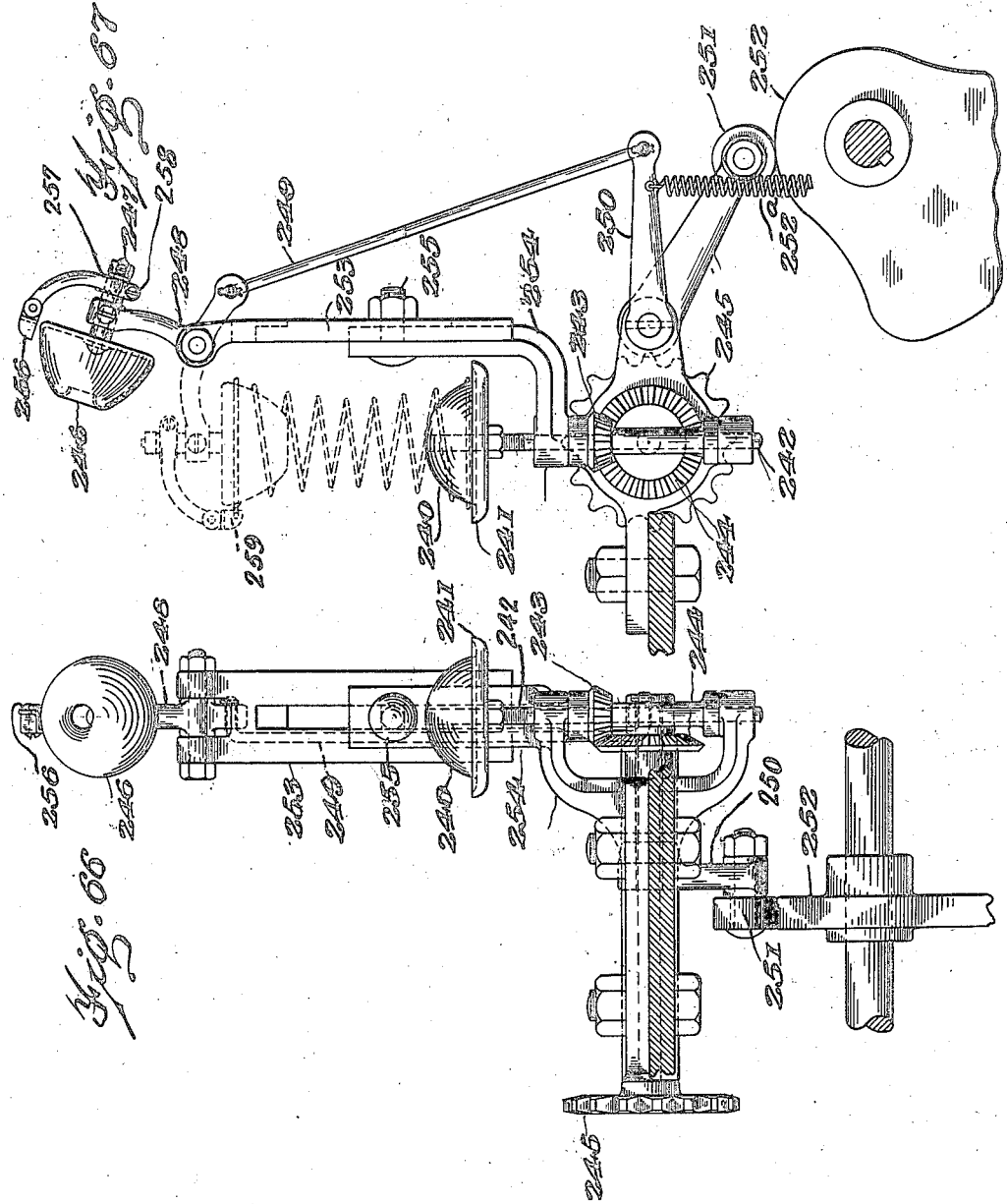

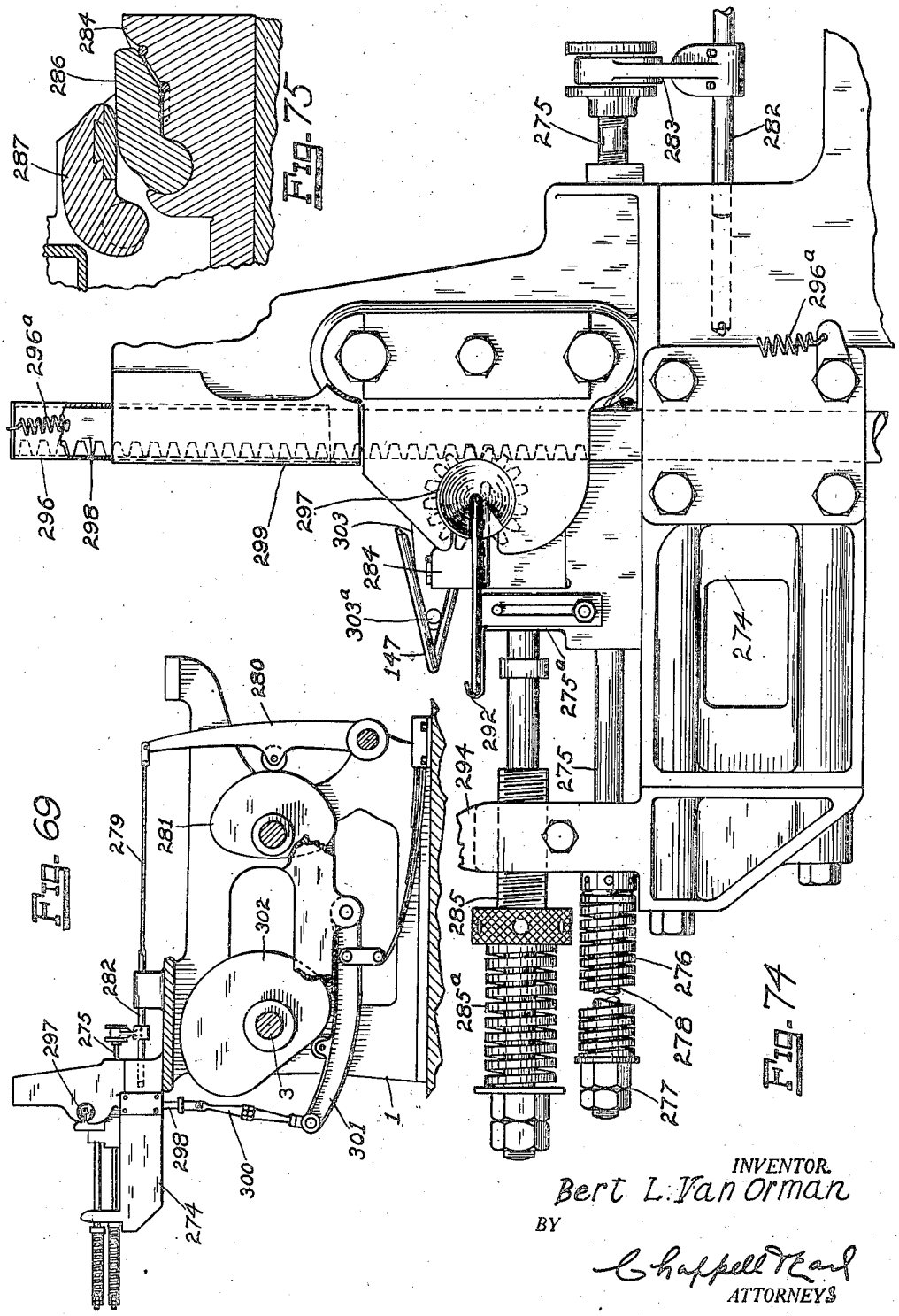

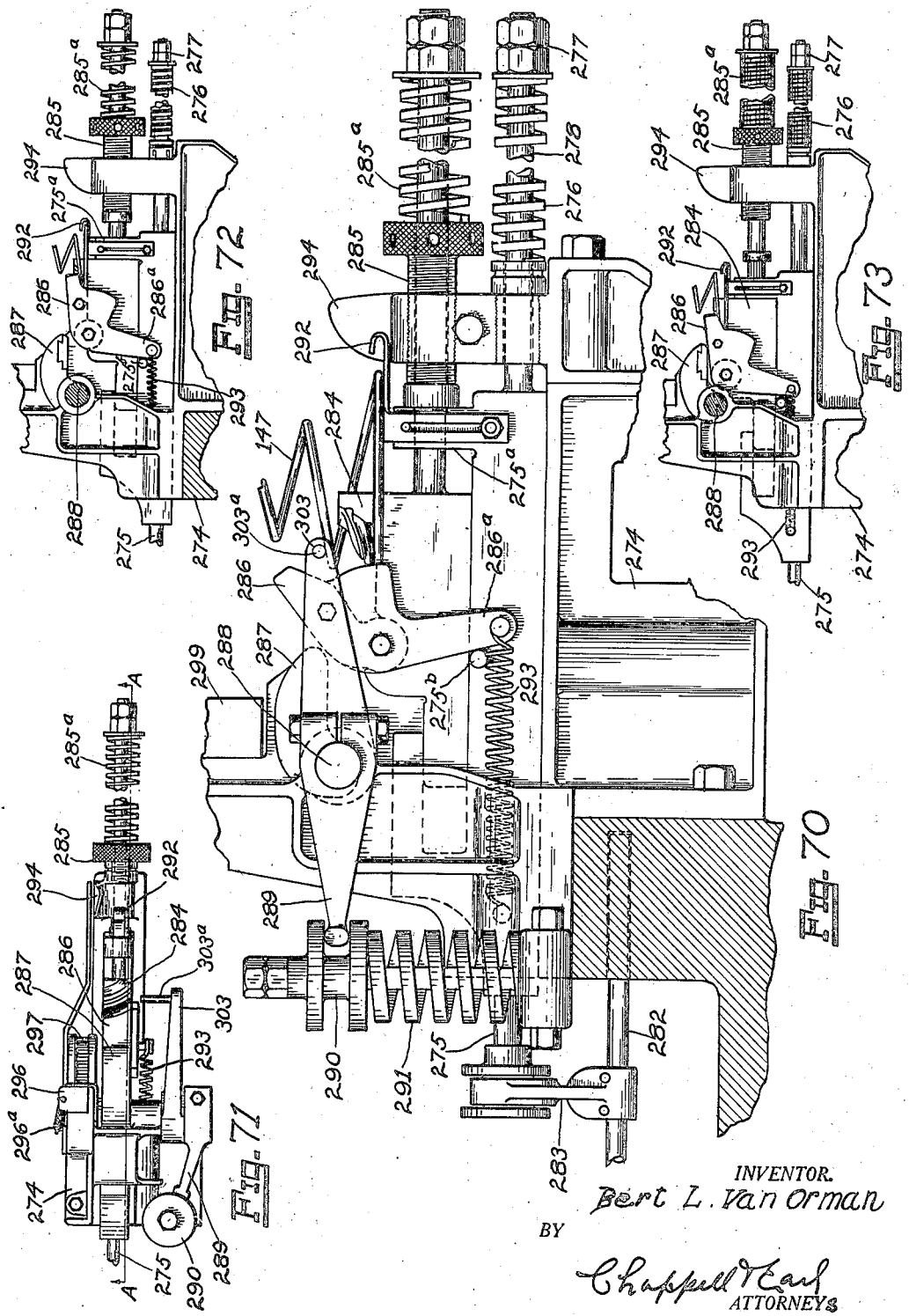

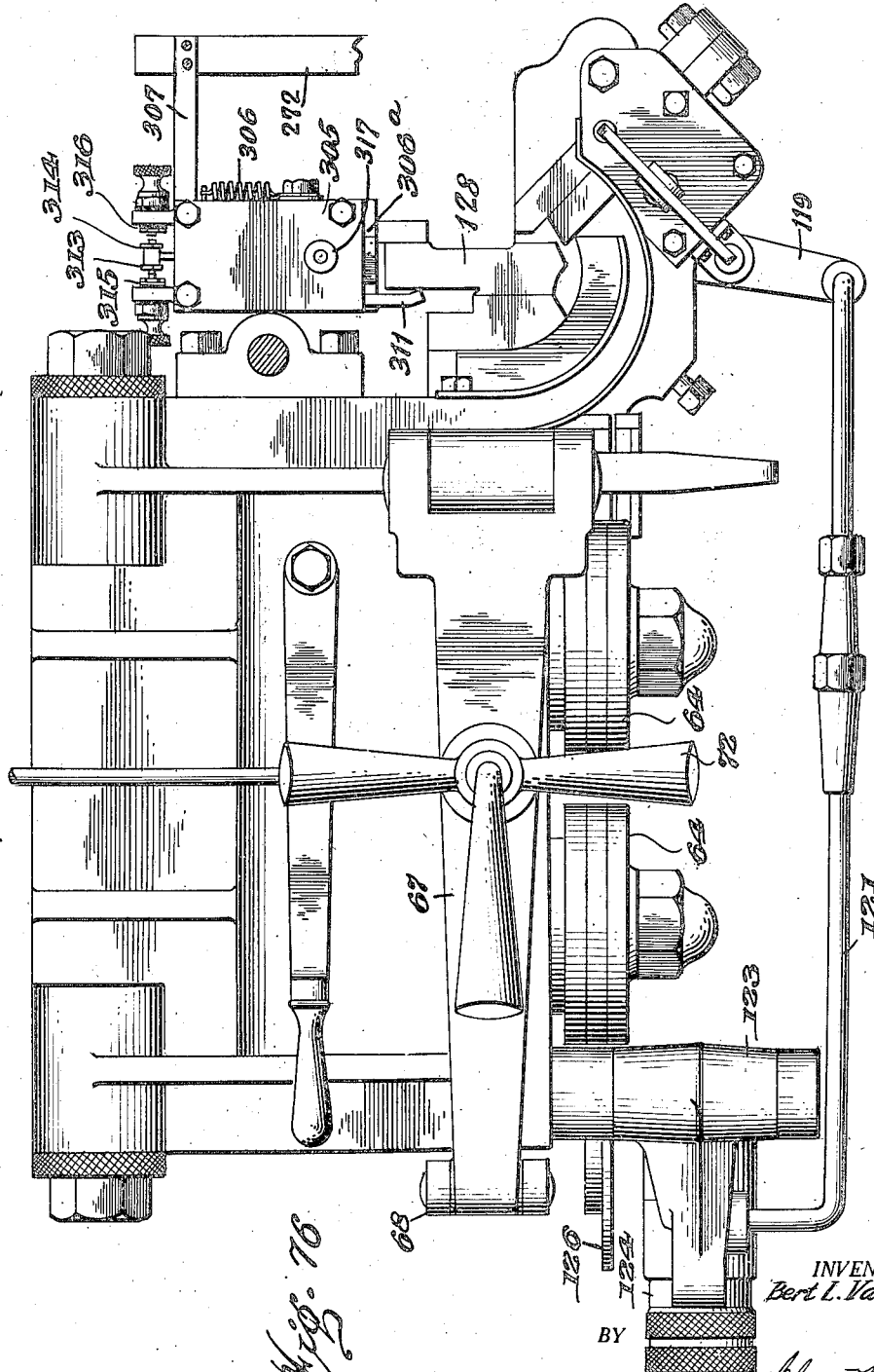

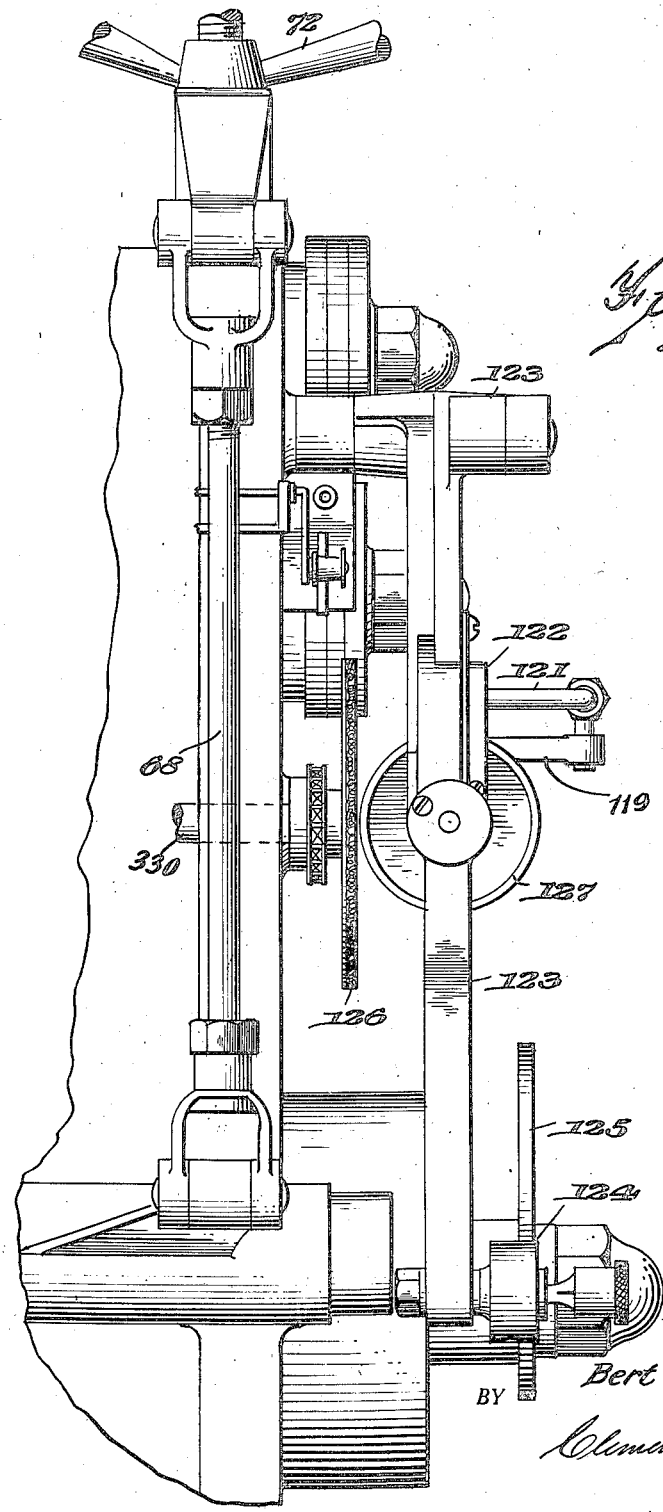

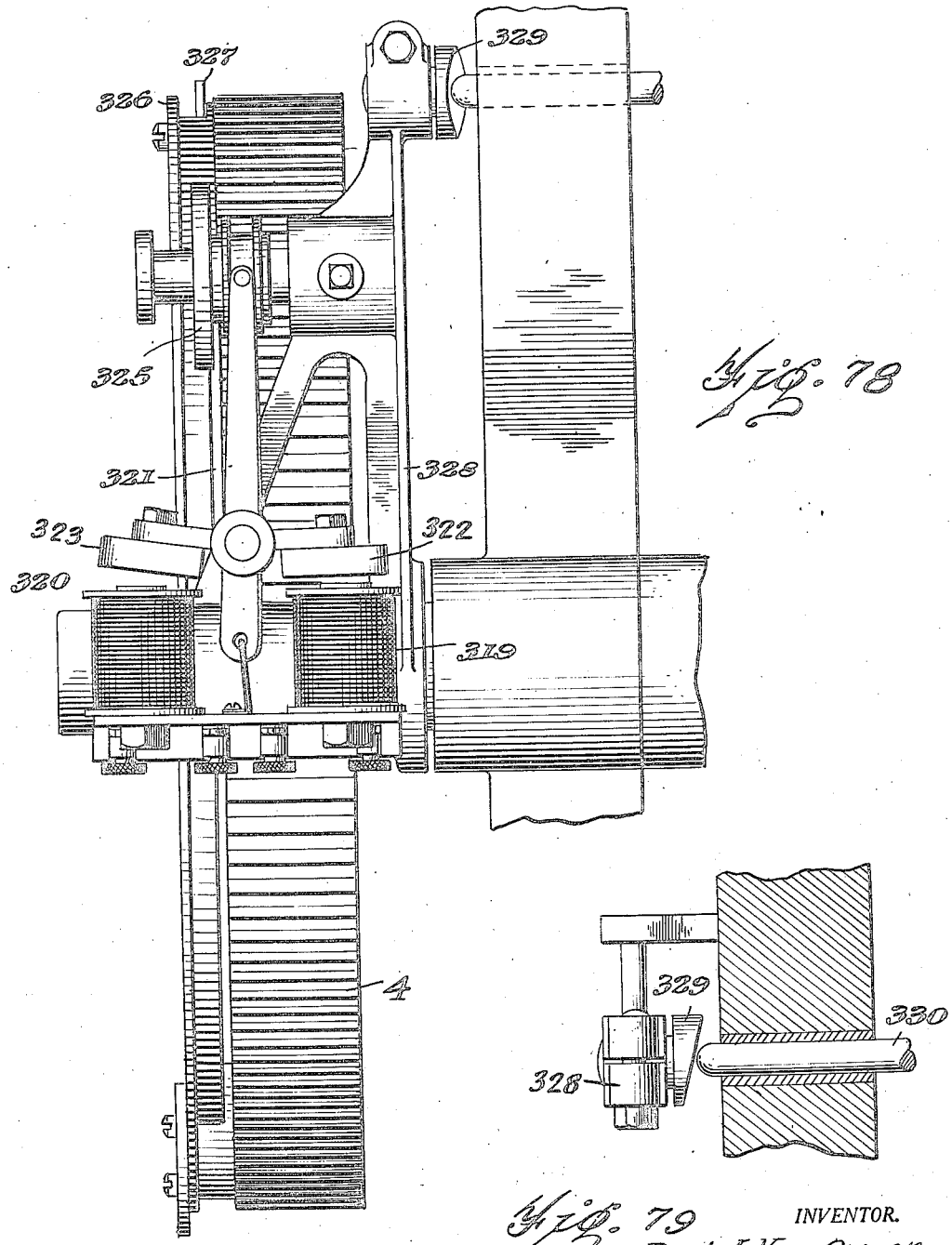

Jan. 15, 1924.

B. L. VAN ORMAN 1,480,796

WIRE SPRING MAKING MACHINE

Filed June 2, 1921   35 Sheets-Sheet 34

INVENTOR.

BY Bert L. Van Orman

ATTORNEY.

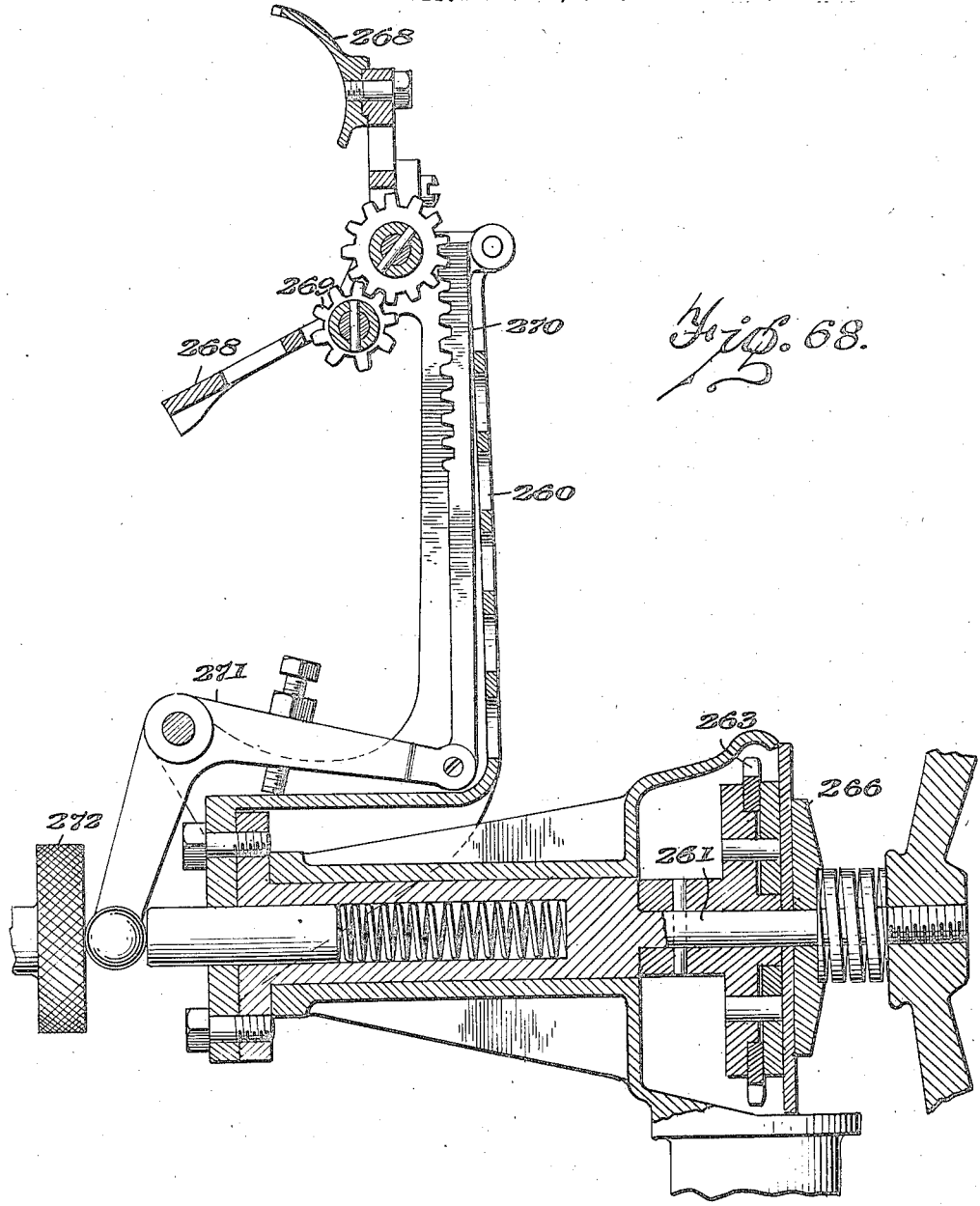

Patented Jan. 15, 1924.

1,480,796

UNITED STATES PATENT OFFICE.

BERT L. VAN ORMAN, OF WYANDOTTE, MICHIGAN, ASSIGNOR TO L. A. YOUNG INDUSTRIES, INC., OF DETROIT, MICHIGAN, A CORPORATION OF MICHIGAN.

WIRE-SPRING-MAKING MACHINE.

Application filed June 2, 1921. Serial No. 474,399.

*To all whom it may concern:*

Be it known that I, BERT L. VAN ORMAN, a citizen of the United States, residing at Wyandotte, in the county of Wayne and State of Michigan, have invented certain new and useful Improvements in Wire-Spring-Making Machines, of which the following is a specification.

This invention relates to improvements in spring forming machines.

In the manufacture of coil springs, such as are used in spring seat and spring bed constructions, it has been customary heretofore to depend upon manual labor in feeding the coiling means, and also in regulating the governing device whereby the coiling machine makes the coil of the desired pitch and diameter and in compensating for the variations in hardness and in gauge which occur in all bundles of wire. This causes irregularity either through carelessness or inattention on the part of the operator wherefor the coils vary in length, in size and in pitch, in fact, it is not possible to secure a uniform product when manual manipulation is depended upon. The variation in size and pitch cause increased difficulty in assembling.

The change in the length of the wire sometimes amounts to as much as even seven or eight per cent and in fact usually ranges from three to eight per cent, depending upon working conditions. This means that the spring uses this much more wire than is required and where a definite sized spring has been determined upon and manufacturing cost has been based thereon, the loss this occasions is large. Where the springs, after being coiled, are knotted or tied to form closed loops at each end, there is another variation caused by the interposition of the operator in feeding the coiled wire into the knotting device which requires that a particular position of the otherwise free end of the wire coil be maintained in order to permit the knotter to function properly and the wire must also be held for the knotting operation with a particular degree of firmness.

This invention relates to a wire spring making machine wherein wire springs of the type above noted are made and delivered ready for assembly or in bales for shipment, with substantially no variation in size, with substantially no excess wire and with no defective knots. These results are obtained by automatic controlling and feeding devices which maintain the desired position and tension of the wire and accurately present the unfinished article as it progresses through the machine to the various operating mechanisms with the regularity that cannot be obtained even by the most skilled hand operators.

The invention consists in the matters hereinafter set forth and more particularly pointed out in the appended claims.

In general terms, the mechanism includes a main frame on which driving members are interconnectibly mounted so as to provide means for transferring power and imparting motion to the various components. From these driving means, a wire holder or carrier is operated so as to automatically move from a position where it is easy to place a heavy bale of wire thereon into proper relation for delivery of the wire through the initial feeding mechanism.

A wire coiling mechanism likewise is operated by the driving means and is supplied through the initial wire feeding means which not only delivers the wire at a constant speed suitable to conform with the requirements of the coiler, but also maintains the requisite tension and prevents any back-lash or slack in the wire. During the process of coiling, the form and size of the spiral obtained is controlled by a governor which so shifts the parts of the coiler that variations in gauge of the wire and in the hardness thereof are compensated for, the governor testing each spring as it is coiled and preventing any undersize or oversize or change in pitch. When the coil is completed, the lower turns thereof are gripped by a carrying mechanism which holds them rigid while a cut-off mechanism severs the finished coil from the feeding wire and maintains the lower turns in such relation to a knotting device to which the carrier immediately presents the coil as to insure accurate operation of the latter and a mechanically perfect knot or tie at the spring end. This carrier which is driven from the main operating members, serves thus not only for holding the wire coil rigid when being severed, but also maintains it with the requisite firmness while being tied.

A second knotting device is also driven from the power member and is fed through the medium of a transfer and locator which grips the coil as it is released by the first carrier after being knotted at one end, turns it into position for accurate registration of the free end with the second knotter and presents it to the latter and firmly holds it during the subsequent tying process. In the form of mechanism herein shown, the spring is inverted while being conveyed from and located for the second knotter, but this is a matter of convenience in the particular arrangement of the mechanism as herein shown as assembled since the relation of the two knotters to the assembling mechanism may be changed to permit this feeding without inversion. The final knotting process by the second knotter which is likewise operated by the main driving members, is followed by the ejectment therefrom of the finished spring by a suitable means.

In the drawings, Fig. 1, Sheet 1, is a plan view of a machine that embodies features of the invention.

Fig. 2, Sheet 2, is a view in end elevation of the wire bale or loading end of the machine.

Fig. 3, Sheet 3, is a view in side elevation of the governor side of the machine around which the wire passes from the bale holding reels.

Fig. 4, Sheet 4, is a view in elevation of the opposite feed roll or delivery side of the machine.

Figs. 5 to 17$^a$, inclusive, are illustrations of wire bale holding means, and directly associated mechanisms, and specifically are as follows:

Fig. 5, Sheet 5, is a view in detail side elevation of the bale holding device.

Fig. 6, Sheet 6, is a view in detail, partially in section, of the clutch mechanism.

Fig. 7, Sheet 6, is a view in detail on or about line VII—VII of Fig. 6.

Fig. 8, Sheet 7, is a view in detail on or about line VIII—VIII of Fig. 6.

Fig. 9, Sheet 7, is a view in detail, on or about line IX—IX of Fig. 8.

Fig. 10, Sheet 7, is a view in detail taken on or about line X—X of Fig. 9.

Fig. 10$^a$, Sheet 10, is a view in detail on or about line 10$^a$—10$^a$ of Fig. 10.

Fig. 11, Sheet 7, is a view in detail of a release clutch.

Fig. 12, Sheet 7, is a view in detail of the driving part of the clutch.

Fig. 13, Sheet 8, is a view in detail of a clutch tripping mechanism on or about line XIII—XIII of Fig. 5.

Fig. 13$^a$, Sheet 10, is a view in detail taken on or about line 13$^a$—13$^a$ of Fig. 5.

Fig. 13$^b$, Sheet 10, is a view similar to Fig. 13$^a$, showing the parts in actuating position.

Fig. 14, Sheet 8, is a view in detail on or about line XIV—XIV of Fig. 13.

Fig. 15, Sheet 8, is a view in detail taken on or about line XV—XV of Fig. 14.

Fig. 16, Sheet 9, is a plan view of a wire bundle reel.

Fig. 17, Sheet 9, is a view in detail of the reel, taken on line XVII—XVII of Fig. 16.

Fig. 17$^a$, Sheet 10, is a detail of the reel cover in section on line 17$^a$—17$^a$ of Fig. 2.

Figs. 18 to 32 inclusive show a preferred form of wire feeding and tensioning means, and specifically are as follows:

Fig. 18, Sheet 11, is a plan view of a wire tension and feeding means.

Fig. 19, Sheet 12, is a view in end elevation of the parts shown in Fig. 18.

Fig. 20, Sheet 12, is a view in detail of feeding rolls in section on line XX—XX of Fig. 18.

Figs. 21 and 22, Sheet 11, are views in detail of a slide wire guide.

Figs. 23 and 24, Sheet 11, are views in detail of a detent.

Figs. 25 and 26, Sheet 11, are views in detail of a guide for directing wire.

Fig. 27, Sheet 13, is a view in detail through the feeding roll taken on or about line XXVII—XXVII of Fig. 18.

Fig. 28, Sheet 13, is a view in detail of an electric clutch release.

Fig. 29, Sheet 13, is a view in detail of a driving cam adjustable to vary the period of the feeding movement, in section on line XXIX—XXIX of Fig. 27.

Fig. 30, Sheet 13, is a view in detail of a wire cutting device, in section on line XXX—XXX of Fig. 18.

Fig. 31, Sheet 13, is a view in section of the cutter on line XXXI—XXXI of Fig. 18.

Fig. 32, Sheet 13, is a view taken on or about line XXXII—XXXII of Fig. 31.

Figs. 33 to 45 inclusive relate to the coiler and are as follows:

Fig. 33, Sheet 15, is a plan view of a coiler that embodies features of the invention, partially broken away.

Fig. 34, Sheet 14, is a side elevation of the coiler mechanism.

Fig. 35, Sheet 16, is a detail view, partially broken away, in rear elevation.

Fig. 36, Sheet 16, is a detail view in end elevation showing the position assumed by the parts of the device indicated in Fig. 35.

and showing the coiler after a spring has been completed.

Figure 37B:
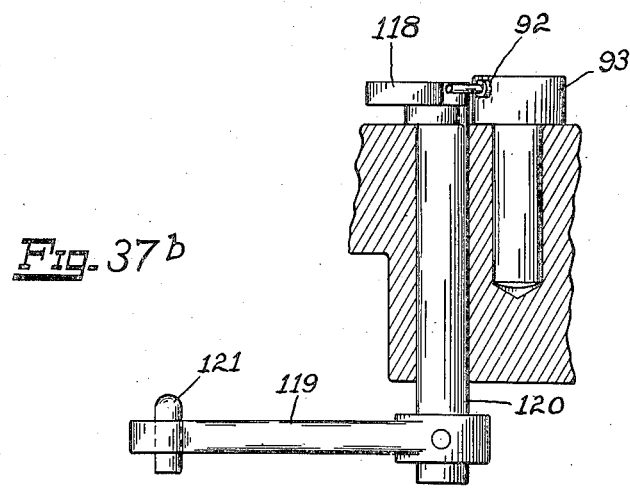

Fig. 37, Sheet 17, is a view in section taken on or about line XXXVII—XXXVII of Fig. 33.

Fig. 37ª, Sheet 18, is a detail view of a coiler in section on line 37ª—37ª of Fig. 37.

Fig. 37ᵇ, Sheet 18, is a section on line 37ᵇ—37ᵇ of Fig. 37ª.

Fig. 38, Sheet 17, is a view taken in elevation from the left of Fig. 37.

Fig. 39, Sheet 17, is a plan view, partially in section, of Fig. 38.

Fig. 40, Sheet 17, is a detail of the spreader tripping mechanism taken in section on or about line XXXX—XXXX of Fig. 38.

Fig. 41, Sheet 17, is a view of a portion of the parts indicated in Fig. 40 after the spreader has fallen.

Fig. 42, Sheet 14, is a view in section taken on or about line A—A of Fig. 41.

Fig. 43, Sheet 16, is a detail plan view of the spreader bar.

Fig. 44, Sheet 16, is a view in section taken on line B—B of Fig. 43.

Fig. 45, Sheet 16, is a view taken on or about line C—C of Fig. 44.

Figs. 46 to 54 inclusive relate to a knotter and are arranged as follows:

Fig. 46, Sheet 19, is a view in elevation of a knotter in open position ready for advancing and drawing springs from the coiler.

Fig. 47, Sheet 20, is a view in elevation of the knotter gripping a spring in the coiler.

Fig. 47ᴬ, Sheet 20, is a view in elevation of the knotter retracted with the spring in position for knotting.

Fig. 47ᴮ, Sheet 21, is a view in elevation reverse to Fig. 47ᴬ.

Fig. 48, Sheet 22, is a plan view of the parts as disclosed in Fig. 46.

Fig. 49, Sheet 22, is an end view of the knotter with parts broken away.

Fig. 50, Sheet 22, is a view in section on line L—L of Fig. 49 showing a spring about to enter a knotting gear.

Fig. 51, Sheet 22, is a view showing a spring entered in the knotting gear.

Fig. 52, Sheet 22, is a view showing the spring after the knotting operation and before withdrawal from the knotting gear.

Fig. 53, Sheet 23, is a view in detail and longitudinal section enlarged, of the jaws of the knotter and associated mechanism.

Fig. 54, Sheet 19, is a view in detail in section on line LIV—LIV of Fig. 51, of a knotting gear and rack.

Figure 55:
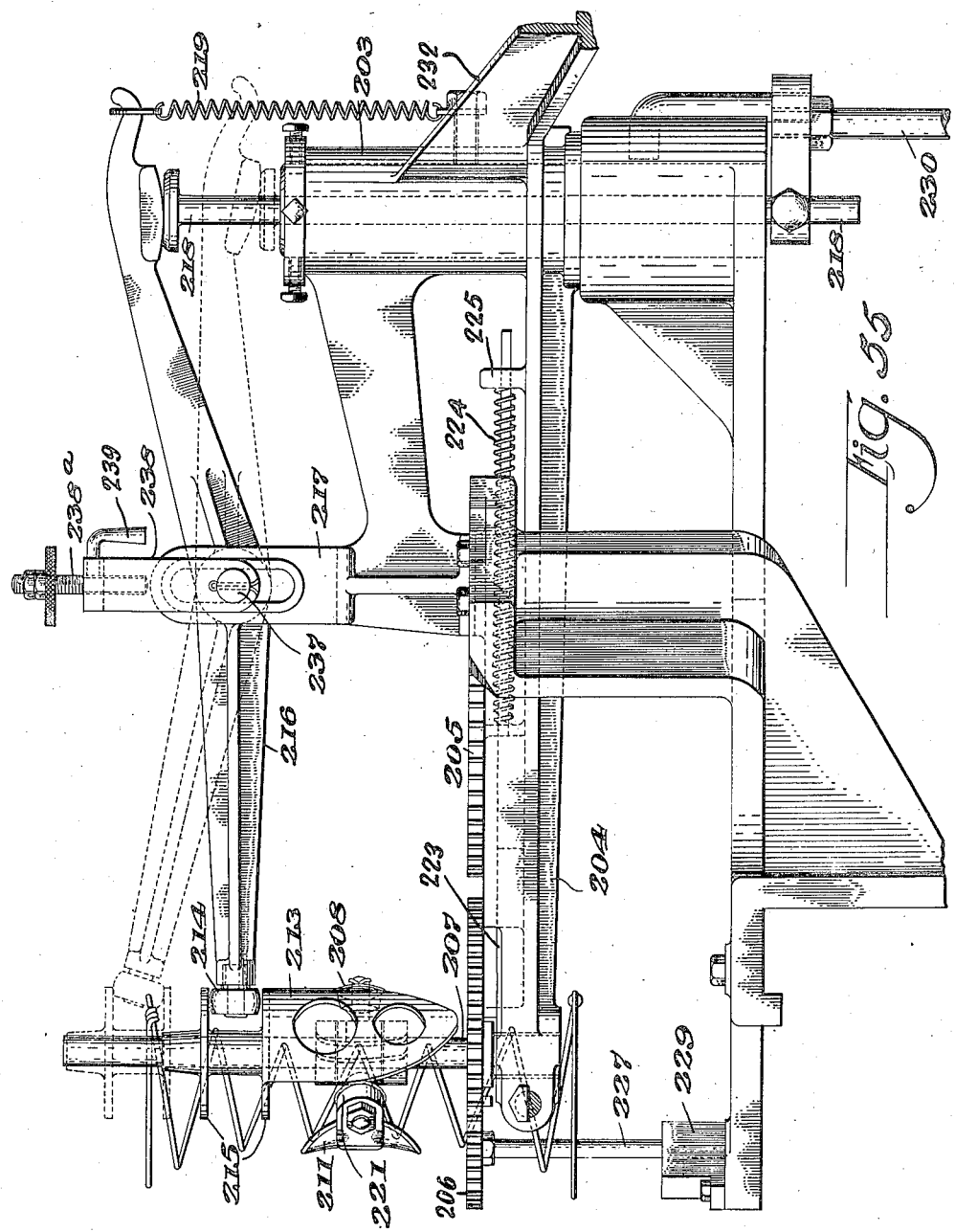

Figs. 55 to 65 inclusive, illustrate a transfer for carrying springs from the knotter to a locator and inverting arm, and are arranged as follows:

Fig. 55, Sheet 24, is a view in side elevation of a transfer between the first knotter and a locator.

Fig. 56, Sheet 25, is a plan view thereof.

Fig. 57, Sheet 26, is a view in detail of the operating cam and connections of the transfer.

Fig. 58, Sheet 26, is a view in end elevation of the parts depicted in Fig. 57.

Fig. 59, Sheet 27, is a view in detail of transfer grippers closed upon a spring.

Fig. 60, Sheet 27, is a view in detail of the transfer grippers in release or open position.

Fig. 61, Sheet 27, is a view in detail of a pinion locating slide on the transfer arm.

Fig. 62, Sheet 27, is a view in detail of a segmental pinion.

Fig. 63, Sheet 27, is a view in detail of a gripper spreader.

Fig. 64, Sheet 27, is a view in detail of a spreader reciprocating yoke and cam.

Fig. 65, Sheet 25, is an end view of the transfer arm.

Fig. 66, Sheet 28, is a view in elevation of a locator for bringing a spring into registration with a knotter.

Fig. 67, Sheet 28, is a view in side elevation of the locator.

Fig. 68, Sheet 35, is a detail view of the transfer means from the positioning means to the second knotter.

*Views of second knotter.*

Fig. 69, Sheet 29, is a detail elevation of the second knotter and its actuating means.

Fig. 70, Sheet 30, is an enlarged view in elevation from the opposite side showing the knotter in open or receiving position.

Fig. 71, Sheet 30, is a plan view of Fig. 70.

Fig. 72, Sheet 30, is a view showing the gripper jaws closed upon a spring.

Fig. 73, Sheet 30, shows the spring moved into operative position with the knotter.

Fig. 74, Sheet 29, is an enlarged elevation reverse to Fig. 73.

Fig. 75, Sheet 29, is an enlarged section taken on line A—A of Fig. 71.

Fig. 76, Sheet 31, is a plan view of a governor for a coiler.

Fig. 77, Sheet 32, is a view in front end elevation of a part of the governor, on the right hand side.

Fig. 78, Sheet 33, is a view in front end elevation on the left hand side.

Fig. 79, Sheet 33, is a view in detail in section of a wedge for moving a shaft axially.

Figure 80:
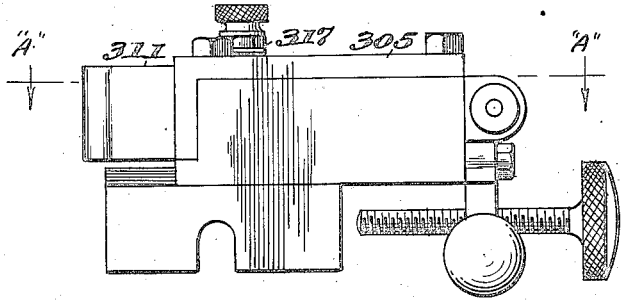

Fig. 80, Sheet 34, is a view in side elevation of a tester casing.

Figure 81:
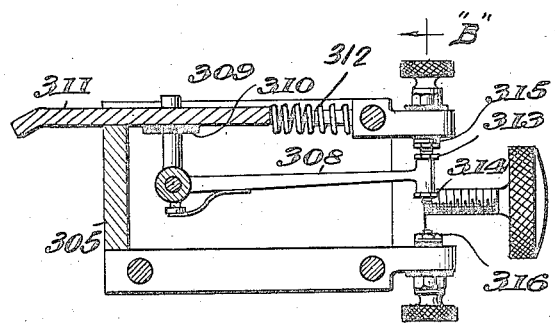

Fig. 81, Sheet 34, is a view in section on line A—A of Fig. 80.

Figure 82:
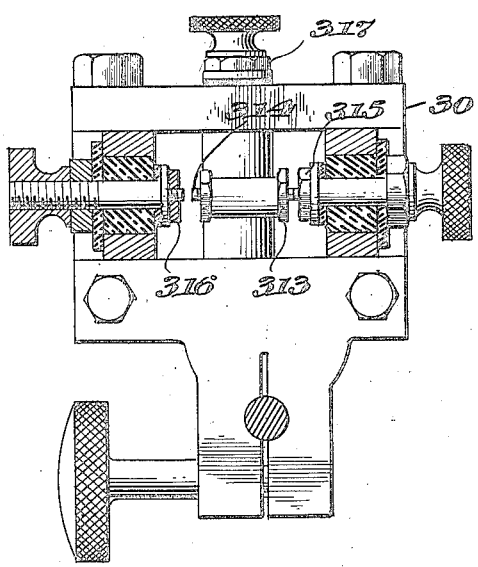

Fig. 82, Sheet 34, is a view in section on line B—B of Fig. 81.

In the drawings, a main frame 1 of suitable design, carries a main drive shaft 2 appropriately geared to a shaft 3 which in turn rotates an intermediate shaft 6 through driving gears 4 and 5. Another shaft 7 is operated from the shaft 6 by means of the gear 8 meshing with the gear 5. From these shafts power is applied to the various portions of the machine through various take-off and motion transmitting and distributing means of approved type.

Reels at one end of the machine receive and hold mill wire bundles or bales in such position that the wire is easily drawn therefrom and fed to the spring forming means. Any type of reel which will carry a bundle or wire may be used. In the preferred form shown herein, provision is made for readily placing bales of wire which are of considerable weight, upon the machine. A double reel holder 9 is journaled on an obliquely disposed standard 10 in the main frame so that a reel 11 journaled on one end of the holder is in tilted oblique position for ready loading when in receiving position, while the other reel 11', the axis of which is oblique to that of the other reel and to that of the holder, is in substantially upright position when in delivery or unreeling position. While the reel holder may of course be turned by hand to throw these reels as desired from receiving to delivery position, it is preferable to operate it by power and as herein shown, the reel holder is rotated on the oblique standard 10 by a gear 13 in mesh with a pinion 14 driven through a shaft 12 and worm gear 15 from a worm 16ᴬ. The latter may be locked to a take-off member 17 of a driving shaft 18 having universal couplings 19, through an appropriate clutch. The couplings merely avoid the necessity of accurate alignment of the shaft.

The clutch consists of drive-pins 20 in the take-off member 17, which latter is rotatable on the worm-shaft 16 and is locked thereto whenever a spring 21 in a clutch plate 22, keyed to the shaft 16 thrusts a latch 23 into the path of the pins 20. This action of the spring is prevented and the clutch held uncoupled by means of a release plate 24 which is adapted to enter a notch of the latch 23 so as to hold the latter out of the path of the pins 20.

The clutch is allowed to go into engagement when a lever 25 carried on a rock shaft 26 is raised, thereby lifting the release plate 24 out of the notch of the latch 23. When the release plate is dropped back into the path of the latch 23, the revolution of the clutch brings a shoulder of the notched latch into contact with a beveled edge of the release plate and pulls the latch out of range of the pins 20. (See Fig. 10ᵃ.)

When a bale of wire in the reel 11' becomes exhausted, the last end passes completely through suitable guides 32 and 33 on the post 30, and releases a dog 34 which lies under the wire and is pivoted in a holder 35 mounted on the post. This dog normally locks an upright 36, longitudinally reciprocatable in a slide bracket 29, from rising under the expansion of a spring 37, in compression between the head of the member thereof and the bracket 29. When this action of the spring occurs, a rack 39 adjustably mounted on and carried by the upright 36, operates a gear sector 40 secured to a trip plate 28 that is hinged in the bracket 29, moving the trip plate into the path of a roller 31 on the gear 8 of the outer counter shaft. Engagement of roller 31 with the trip plate slides the bracket 29 downward on the post 30 and lifts the cover 54 high enough to allow clearance when the reels change positions, the cover being connected to the bracket 29 by a suitable flexible member 45 passing over guide sheaves 46 on a bracket 47 of the machine.

As the bracket 29 is moved downward, a hook 42, secured to the bracket, engages an arm 27 carried by the rock shaft 26, thereby lifting the release plate 24 and allowing the clutch of the reel swinging means to become engaged.

Thus the clutch is tripped or thrown into action and the power shaft 18 driven by a suitable belt or other means, rotates the worm shaft 16 until the emptied reel is moved back to loading position and the loaded reel moved to discharge position. When in operative position, a roll 41 on an extension of the clutch arm 25 which bears against the periphery of the gear 13, drops into a notch or recess in this periphery and by throwing the release plate 24 into engagement with the latch of the clutch, stops the rotation of the worm shaft.

At this instant of arrest, the slide member 29 has reached the bottom of the post where it is caught by an appropriate foot latch 43 and held there. When the reel is in this position and the wire has then been drawn through the guide 32 and 33 and onward through the machine, the foot latch 43 is depressed by the operator, and the cover 54 which with the weight 44 acts as a counterbalance for the member 29 drops into interlocking engagement with the reel and carries the bracket slide 29 upward to initial position, the shock of the action being modified by a suitable dash pot 48, the piston 49 of which moves with the slide member 29.

Continued falling of weight 44 after the cover 54 has come to rest, causes a depending latch 50 to yieldingly engage with radially disposed latch fingers 51 carried on the inner portions of the arms 52 that form the reels herein shown, and locks the cover in place on the reel. The rim 53 which connects the outer ends of the arms 52 lies in spaced relation to the cover plate 54 when the parts are locked together so as to permit free passage of the wire between them. Of course, any type of reel may be used, the design herein shown being perhaps preferable for this arrangement of the mechanism.

After the wire reaches the guide which controls the trip mechanism of the clutch of the bundle carrier, it is led to a set of feeding rolls through means which prevent recoil of the wire and at the same time provide for an even tension thereon. This is necessitated because of the fact that the feeding mechanism is intermittent in action to allow time for knotting and cutting and the checking of the wire feed during the cut-off operation must be provided for in the wire feeding means. Accordingly, a guide 55 is mounted on the main frame in appropriate relation to the free end of a swinging tension 56 which is pivoted on a suitable bracket 57 of the main frame to move outwardly under the effect of a spring 58 in compression between the arm and the frame on a suitable keeper 59. A guide 60, guide rolls 61 and final guide roll 62 define the path of the wire, the tension on which acts in opposition to the spring 58 so that the wire leaves the final guide roll 62 on the bracket 57 under proper stress.

A pair of lower feed rolls 63 which are geared by appropriate means to the power shaft 2 are mounted in co-operative relation to a pair of upper feed rolls 64 that are journaled in a bearing block 65. The latter is pivoted on cross pins 66 of the frame 1 so that the desired pressure may be applied to the rolls intermittently by a presser arm 67 pivoted to the main frame at one end and coupled at the other end by a link 68 with a cam lever 69, which is actuated by a cam having an adjustment for varying the "dwell" or "delay", indicated generally at 70. This cam is driven by the shaft 3. A tension screw 71 and hand wheel 72 provide for adjusting pressure under the stroke of the lever 67.

The cam 70 consists of a pair of sections 73 and 74 held in spaced relation by a graduated collar 75 on the shaft secured to the section 73. A clamp 76 passing through transverse opening of the shaft frictionally engages the section 74 and a set screw 77 and interposed rod 78 in an axial bore of the shaft permit the ready adjustment of the collar in relation to the disc 74 so that the pair of cam rollers 79 and 80 which are carried by the end of the arm 69 operate the rock arm as desired, the angular relations of the sections determining the length of the "dwell".

To prevent recoil of the wire before it enters the rolls, whenever the intermittent action of the cam raises the rolls and releases the grip upon the wire, a detent is provided which consists of a bell crank lever 81 pivoted on a bracket 82 through an opening of which the wire is threaded so that the depending arm of the bell crank plays in a slot of the bracket at such an angular relation to the wire that the pull of a spring 83 on the bell crank, while it permits the movement forward of the wire, prevents retrograde movement because of the gripping action of the bell crank and the bushing. An intermediate guide 84 is also provided between the rolls and as the wire is forced outwardly from the rolls, it passes between the stationary section 85 and the adjustable section 86 of a final guide block, the sections being pivoted together at 87 and clamped by a suitable hand lever 88 in closed position whereby ready access may be made for inspection of the part and for initial entering of the wire into the guide, there also being provision for wear and take-up by the insets 89 of hardened metal.

To sever the wire as desired, a cutter 90 is reciprocated across the face of a stationary cutter bar 91 transversely to the wire so that the latter is cut by the shearing edges of the cutters. To insure accurate cutting of the wire, the cutting device preferably includes a bushing 92 adjustably secured in the head 93 of a stud which is rotatably adjustable. As herein shown, as one means of reciprocating the cut-off 90, the latter is projected by a lever 94 pivoted to the main frame that rides on a cam 95 on the shaft 6 with an adjustable thrust screw 96, return movement of the cutter being accomplished by a lever 97 acting on a presser block 98 under the stress of a spring 99, the presser block abutting the cut-off 90.

To prevent the over-running of the reel and thereby allowing the arm 56 to swing out too far, a contact point 100 on the latter touches a contact point 101 (see Figs. 19 and 28) on the machine which is electrically connected with a magnet 102 and suitable energizing means 103. The magnet thereupon depresses one arm of a brake lever 104 that frictionally engages the annular face of the hub of the reel and thereby arrests the latter.

As before noted, the rolls are driven by any appropriate mechanism from the shaft 2 and this as herein indicated includes any preferred type of clutch 105 which may be operated by a shifting member 106 which through the medium of a slotted link 107, connecting bar 108 and gear shift handle 109 may be set to drive the shaft at equal or different speed to the driving pulley journaled on the shaft. This detail of driving mechanism does not form per se a part of this invention and is not therefore described herein in detail.

The shaft which is driven by the clutch is geared through the reduction train indicated at 110 and 111, 112 and 113 with the drive shafts 114 of the rolls 63, the upper rolls 64 being operated by intermeshing gears 115, the slight movement necessary to move the upper rolls away from active co-operation with the lower rolls by swinging the bearing block on the pivot pin 66, not being sufficient to throw these gears out of mesh. The clutch 105 is thrown out of gear if the wire becomes tangled or otherwise fails to feed freely from the reel, or in any way causes the inward movement of the tension arm beyond its limit, through the medium of an electrical magnet 116 which is in circuit with the generator 103 and a circuit closer 117 which is shut whenever the tension arm swings in beyond its normal range of movement. This prevents any undue strain on the machine.

As the wire passes through a guide bushing of the cut-off and before severance, it is directed against an oblique face of a coiler block 118. The latter is oscillated transversely to the path of direction of the wire by an arm 119 secured to the shaft 120 on which the block is mounted, and moved by a link 121 adjustably attached by a member 122 to a swinging arm 123 pivoted at the upper end on a main frame and provided at the lower end with a cam roll 124 lying on a cam 125 against which it is held by a spring 123ᴬ. To vary the throw of the coiler block 118, the center of connection on the arm 123 is shiftable by turning a worm shaft indicated generally at 124ᵃ which in turn rotates a worm gear, not detailed, the hub 125ᵃ of which forms a support for the adjustable arm 122. This rotation of the worm may be accomplished either manually or by means of a friction disc 126 transversed by a friction pulley 127 on the end of the worm shaft 124ᵃ, the friction disc rotating at all times and being projected into contact with the pulley at the will of the operator or if desired by automatic controlling means. The latter constitutes the governor of the machine and one form thereof is hereinafter described.

The deflected wire end which is turned inwardly in an arc, the radius of which is dependent on the angular position of the coiler block 118, over-runs a vertically movable spreader bar 128, the end of the wire being given an upward movement just before it reaches the thin edge of the inclined face of the spreader block by a booster 129 which is thrust up by the end of a swinging arm 130 mounted on a rock shaft that is actuated by a cam arm 131, the cam roll 132 of which rides on a cam 133 carried by one of the driving gears of the machine. The movement of the booster is just sufficient to insure the overrunning of the spreader by the wire. The speader itself is moved upwardly just as the wire starts to over-run it and in co-ordination with the swinging arm 123, by a post 134 vertically adjustable by screw threaded engagement with a block 135 carried by a slide rod 136 which is reciprocated by a cam arm 137, the roll 138 of which rides upon a suitable cam 73. In order to hold the spreader in the upper position during the coiling of the spring, the arm 137 carries a block 140, the lower notched portion of which passes above a bolt 141 as the arm 137 reaches its upward limit of motion. A spring 142 snaps the bolt underneath this notched edge of the block and thereby locks the arm and its connected parts in raised position. The spreader determines the pitch of the spring.

Retraction of the spreader to initial position occurs in conjunction with the movement of the cut-off mechanism heretofore described, which severs the coiled wire. This co-ordination of movement is effected by a trip arm 143 angularly adjustable by means of a slot and bolt connection 144 on the lever 94 so that the inner bevel edge thereof can pass a shoulder 146 on the bolt 141 thereby moving the latter back out of engagement with the block 140 and permitting that and the spreader arm to fall.

Just before this action trips the spreader mechanism, the formed spring which has generally taken the position indicated at 147′, is closed together partially by a compressor 148, carried by a stem 149 reciprocatable parallel substantially to the axis of the spring so that the lower turns of the latter are held rigidly in position during the cutting operation and at the same time are maintained within the range of the jaws 150 and 151 of the knotting device which are then advancing toward them. These jaws grip the two bottom coils or turns of the spring while it is compressed and prior to the operation of the cut-off.

In preferred form, the upper jaw 150 of the knotting device is rigidly secured to a hollow bar 152 that is reciprocatable between a lower guide 153 and an upper guide 154 mounted on the frame, the upper guide being yieldingly held by a spring 155, arm 156 and check nuts 157, screw threaded on a spring keeper 158. A cam 159 on the shaft 7 that is connected by a roll 161 to a rock arm 162, moves the latter and thereby reciprocates the slide to which the rock arm is connected, by a bar 164 having screw threaded adjustment for changing this mechanism. The lower jaw 151 is pivoted to the hollow bar 152. A push rod 165 abuts the heel 166 of the jaw 151 and is reciprocated in a guide aperture of the slide by a member 167, likewise reciprocatable in the slide bar, through the medium of a link 168 which is pivoted to one end of a rock arm 169. The latter, which is hinged to the slide, is operated by a spring 170 anchored suitably to the slide bar and connected by a link 171 with one end of the rock arm 169. When the slide bar is approaching the other limit of its motion, a pin or lateral extension 171ᵃ upon the rock arm encounters the hook end of a reset arm 172 that is yieldingly held by a pivot 173 on the main frame in the path of motion of the extension by a suitably disposed spring 174. As a result, the rock arm is reversed in position, at which time a trigger 175 drops into interlocking relation with the rock arm and holds the parts until the inwardly extending arm 176 of the trigger 175 under-runs and is depressed by a releasing pin 177. The latter is adjustably secured on an upright rod 178 longitudinally reciprocatable in a guide 179 of the main frame under the influence of a spring 180. The rod 178 and a lever 181 are yieldingly coupled by a spring 182 that is actuated by suitable means, as for example, a cam roll 183 under-running one arm of the lever 181. The jaw 150 when retracted under-runs the upper guide 154, while the lower movable jaw 151, is forced firmly upward and held in position by a block 186 reciprocated in the main frame by a slide bar 187 which is projected under the block 186 by a spring 189 around the stem 190 of the bar, retraction of the block 186 to clear the jaw 151 and allow the latter to drop being accomplished by a lever 191 pivoted on the main frame and oscillated by a cam 192 on one of the shafts of the machine. When the jaw 151 drops away from the position of closure to the open position, while the slide bar is still retracted, the trigger holds the rock arm 169 back so that, the support of the jaw 151 being removed and the spring no longer operating on the push rod 165, the jaw is free to drop into open position.

A knotting gear 193 is journaled in the main frame adjacent the slide bar and in such relation thereto that the end turn of the spring gripped by the jaws 150 and 151 is moved into a radial groove 194 formed in the gear, the end portion of the spring being bent into position substantially radial with the gear and co-incident with the slot by a wiper block 195 against which the retrograde movement of the jaws forces the spring 147. A rack 197 that meshes with the gear 193 is coupled by a connecting rod 198 preferably connected by take-up adjustment means to the end of a rock arm 199. A cam roll 200 on the latter is held against a cam 201 by the action of a suitably disposed spring 202 and link 202ᴬ, the cam being secured on the shaft 7. The compressor cap at the top of the coiling mechanism is retracted to clear the spring to permit withdrawal of the latter from the jaws when they start to return to the knotting gear.

This portion of the mechanism is so timed that just as the slide bar advances until the lower turns of the wire are within the jaw, the releasing pin 177 is depressed so that the jaws snap on the wire because of the pull of the spring 170. Retraction of the slide bar follows until the jaws enter between the upper guide 154 and the lower guide 186 which latter moves up and firmly grips the jaws, the trigger and release mechanism being reset by the encounter of the pin 177ᵃ with the setting finger 172. At this instant, the rack 197 rotates the knotting gear 193, giving the latter a couple of revolutions or so and thereby coiling the free end portion of the wire which is in the slot of the gear, around the spring, thus forming a closed end loop. The guide 186 then drops away from the lower jaw 151 and the latter moves the spring out from the knotting gear and the withdrawal of the spring with the lower loop firmly tied, follows.

At this point, the spring is transferred to a second knotter for the tying of the other end. Any transfer mechanism may be used which will bring the spring into registration with the second knotter, that is, with the free end portion of the upper coil ready to be operated upon by this knotter. In the arrangement of parts herein shown, the hub 203 of a swinging arm 204 is journaled on an upright spindle of the frame in concentric relation to a fixed segmental rack 205. A segmental pinion 206 is pivoted on an upright stud 207 on the swinging arm so as to roll on the rack 205 for a portion of the stroke of the arm. A gripper 208 is secured rigidly to the hub of the pinion to swing with the latter, adjustment being provided for by a split boss 209 and set screw 210. A swinging gripper 211 which co-operates with the fixed gripper 208 is rotatably mounted on the same pinion hub and is normally retracted from the fixed gripper by the action of a suitably applied spring 212. A segmental spreader 213 tapered at the lower end portion is longitudinally reciprocatable on the stud 207 by the action of a friction roller 214 lying between the peripheral flanges 215 of the spreader hub and turning on the outer end of a lever 216, pivoted on an upright 217 of the arm 204 and oscillated by the conjoint action of a lifting rod 218 and spring 219 in tension between the end of the lever 216 and the arm 204. The movement of the lever 216 forces the spreader 213 with its pointed lower end between a roller 220 on the hub of the fixed jaw 208, co-operating with an anti-friction roller 221 on an extension 222 of the movable gripper 211. Depression of the spreader 213 engages it with the rolls and correspondingly forces the grippers toward each other.

During a portion of the movement of the swinging arm 204 it is desirable to avoid rotation of the grippers on their pivot axis which would otherwise result from the continual meshing of the pinion 206 with the rack 205. Accordingly the pinion 206 leaves the rack toward the end of the motion of the arm 204 and particularly as the latter approaches the receiving position. During this phase of movement, a slide 223 longitudinally reciprocatable on the bracket is yieldingly forced by springs 224 in compression between the slide and a lug 225 on the bracket against a pin 226 depending from the hub of the pinion 206.

To insure accurate registration of the pinion 206 and rack 205 during the retrograde movement of the arm, a depending stud 227 on an arm 228 of the pinion swings into contact with a stop 229 on the main frame and slides around it so that the pinion 206 is moved into register position with the rack where it is held by frictional engagement until the rack and pinion mesh. It is to be understood that the lifting rod 218 is moved by suitable connection, as for example, a link 230 which is reciprocated by the driving mechanism in the machine. The oscillations of the bracket in timed relation to this reciprocation of the rod is accomplished by a link 231, pivotally connected to an extension 232 of the bracket at one end and to a cam roll lever 233 at the other end which carries a cam roll 234, the latter rolling on the face of a cam 235 against which it is held by springs 236 or the like. To provide for various sizes of springs, the pivot pin 237 of the arm 216 is carried in a forked stirrup 238 which is vertically adjustable on the slotted upright 217, the desired accuracy being obtained by a set screw 238[a] and clamping handle 239. In operation, the arm 204 swings to and from the receiving position and as it approaches the latter, the grippers which have been opened by the operation of their connected parts, are so disposed as to embrace the spring in the knotter. The gripper jaws are closed upon the spring by the depression action of the spreader and the arm returns to initial position at which point the recession of the spreader allows the spring 212 to draw the grippers apart and release the spring.

At the moment of release by this transfer mechanism, the spring is delivered to means whereby it is inverted and brought into registration with a second knotter. It is necessary that the free end portion of the upper unknotted or open end coil be accurately positioned in relation to this knotter. Accordingly at the moment of release, the spring is in axial alignment with a lower spring seat 240 preferably in the form of a hemispherical plate with concave marginal flange 241 which is adjustably mounted on an upright spindle 242, the spindle being rotated by a pair of bevel gears 243 and 244 from the intermediate counter-shaft of the machine through a sprocket wheel 245 and connecting sprocket chain. A head 246 is pivotally mounted to turn freely on a stud 247 carried on one arm of a bell crank 248 whereby it will be swung in and out of axial alignment with the spring seat 240 by means of a link 249. A crank arm 250 and cam roller 251 traveling on a suitable cam 252 driven by suitable connection with the machine, oscillate the arm 250 in opposition to the action of a spring 252[a]. The bell crank 248 is pivotally mounted on the upper section 253 of a longitudinally adjustable bracket 254 of the main frame or yoke in such manner that the locator may be adjusted by means of a set screw 255 to receive any sized spring within the range of the machine.

A locating finger 256 or stop is adjustably secured by its split hub 257 and set screw 258 on the arm of the bell crank 248 so that the end portion of the finger may be secured in the desired relation to the knotter and within the path of motion of the free end 259 of a spring when the latter is gripped between the spring seat 240 and the head 246 and is turned by frictional engagement with the seat as the latter is rotated.

In operation the spring which is placed on the seat by the transfer is held in position by the head and is then turned by the revolution of the seat until the spring end abuts the stop. This locates the top coil in position required for the knotting operation. Thereafter the spring is inverted and delivered to the second knotter by any preferred device which in this instance takes the form of a swinging arm 260 pivoted on a clutch shaft 261 driven by a sprocket chain 262 in tension over a sprocket wheel 263 between a spring arm 264 and cam reciprocated lever 265. The arm 260 may be engaged by the shaft through a friction clutch 266 and when so engaged, reciprocates from the locator to a second knotting device, the shock of its arrest at the end of each stroke being taken up by cushion spring posts 267. A pair of opposed spring carrying fingers 268 on the arm end are appropriately opened and closed by pinions 269 secured to one of them which is in mesh with a rack 270 on the arm 260, a bell crank 271 on the arm reciprocates the rack when one end of the crank, which is at the axial center of the shaft 261, is reciprocated by a push slide 272 that is operated by a cam 273 on the intermediate countershaft of the machine.

The upright swinging arm delivers the spring to the second knotter. A suitable guide bracket 274 carries a longitudinally reciprocatable slide 275 which is normally projected by a spring 276 in compression between the bracket and stop nuts 277 on a stem 278 of the slide and is retracted by means of a flexible connection 279 between a cam lever 280 and cam 281 and rod 282 reciprocating in the bracket and adjustably connected by the fitting 283 to the slide.

A jaw block 284 that is normally held against a longitudinally adjustable stop 285 by the expansion of a spring 285$^a$, is arranged to receive the bottom coils of the spring 147 inverted thereon by the upright swinging arm 260. A projection 294 on the bracket 274 presents an inclined edge to its seat.

As the slide 275 advances toward the jaw block 284, it moves a hook or bent finger 292 into engagement with the lower coil of the spring 147. At the same time a clamping finger 286, pivoted to the jaw block, is swung downwardly upon the two lower coils of the spring and holds them firmly against the jaw block. (See Fig. 72.) The clamp 286 is actuated by a pull from the slide 275 upon an arm 286$^a$ through a connection 293 that is so constructed as to yield to any abnormal shock imposed upon clamp 286 when gripping the spring, and to compensate for irregularities in the relative movements of slide 275 and arm 286$^a$. Advancement of the slide 275 causes an upwardly extending collar 275$^a$ of the slide to come into contact with the end of the jaw block 284 and pushes the gripped spring into engagement with a knotting gear 297 that is turned by a rack 298 reciprocated in a suitable guide head 299 of the bracket 274 by a connecting rod 300, cam lever 301 and cam 302. As a precaution against the danger of the upper coils of the spring 147 getting into the teeth of the rack 298, thereby causing breakage of parts, the upper portion of the rack is enclosed by a guard cap 296 that extends down within the casing 299 and moves with the rack, being held in place by a spring 296$^a$ anchored at its lower end to the bracket 274. The operation of the knotting gear has already been described as a part of the first knotter.

As the spring moves into engagement with the knotting gear, the clamp 286 is pulled underneath an angularly adjustable stop 287 which aids in holding the lower coils of the spring securely against the jaw block 284 while being knotted. (See Figs. 73 and 75.) The stop 287 is mounted on a rock shaft 288 with an arm 289 operatively engaging a cap 290 and thereby compressing a spring 291, when the stop is encountered by the clamp 286, and cushioning any shock. Advancement of the spring 147 to knotting position also brings the two lower coils underneath a pin 303$^a$ projecting from an arm 303 that is carried by the rock shaft 288. The pin serves to hold the spring 147 level on its seat while being knotted. Retraction of the slides 275 and 284 carries the parts back to the position shown in Fig. 72 and further retraction of slide 275 puts them in initial or open position, the clamp 286 being raised by a pin 275$^b$, projecting from slide 275, in contact with arm 286$^a$.

The retrograde action of the parts clears the spring and gradually retracts it from the knotter from whence it is ejected by a revolving arm 304 mounted appropriately on the frame and driven suitably by the mechanism in timed relation to the knotter action.

The governing means by which the range of motion of the coiler block 118 is shifted to deflect the wire into a coil of greater or less radius consists of the following parts: A testing finger housing 305 is projected by a suitable spring 306 or other means toward the spring being formed on the coiler block 118, on gibs 306$^A$, and is intermittently held away from the inner limit of motion by a member 307 reciprocated by the push slide 272, advancing toward this limit just as the spring is about to be released from the coiler. A bell crank 308 pivoted in the housing 305 in insulated relation thereto has an arm 309 thrust through an insulated bushing 310 in a testing plate 311 which is projected from the casing by a spring 312. A pair of contact points 313 and 314 are carried on the other arm of the bell crank between two terminals 315 and 316 on the housing. A third terminal 317 is secured to the bell crank. When the housing is so positioned at the moment of the arrest of the wire spring formed by the coiler, that the testing plate 311 contacts with a coil of this spring, the coil, if of proper diameter holds the bell crank with the contacts out of touch with both terminals 315 and 316. If the coil made by the coiler is small, the circuit is closed through the terminal 315. If too large, the other terminal 316 is touched.

The terminal 315 is in circuit with an electro-magnet 319. The other terminal 316 is in series with an electro-magnet 320. These magnets are disposed in spaced relation to each other on opposite sides of a shifting lever 321 so as to throw the latter in one way or the other under the pull of oppositely disposed armature plates 322 and 323 on the shifting lever.

Two cam tracks 326 and 327 are mounted, in axial spaced relation to each other, on the shaft 3 of the machine. When in neutral position, the lever 321 holds an axially shiftable roller 325 out of range of either cam. When the tested spring coil is too small, and the magnet 319 is thrown into circuit, the roller 325 is moved to a position where it is engaged by cam 327 and thereby swings an arm 328 so that the bevel block 329, carried by arm 328, acts as a wedge against the end of the friction disc shaft 330 and shifts the latter far enough to cause the disc 126 to contact with the friction pulley 127 on the swinging arm 123 which defines the angular position of the coiler block 118. At this time the relative positions and directions of motion of the several parts are such that the swing of arm 123 has brought the pulley on the proper side of the center of motion of the disc 126 to decrease the deflection of coiler block 118 and cause the next spring to be coiled larger. When the tested spring coil is too large, the opposite magnet 320 shifts the roller 125 into range of cam 326 which is diametrically opposite cam 327 in order to shift the disc 126 into contact with the pulley at a time when the latter is on the other side of the center of motion of the disc, thereby increasing the deflection of the coiler block and causing the next spring to be coiled smaller. After the roller 325 has been shifted into range of cam 326, the latter must travel through approximately 180° before acting upon lever 328; therefore, when shifted, the roller passes outside a guide ring segment 324 which holds the roller in range of cam 326 until the latter has come into action.

Thus when a spring is formed to be under size or over size, the next one which is produced is corrected in this regard. It is to be understood also that the machine as a whole has an electric circuit distributor of standard type, timed to close the various circuits at the instant each should be energized to function properly.

The operation is continuous, save for the periods when wire bundles are being replaced and the wire rethreaded through the parts of the machine. The mechanism is so disposed as to be readily accessible for adjustment and for easily carrying out the initial threading of the wire through the various guides. The interaction of the parts insures accurate locating of the springs as they are being formed for the knotting operations and because of the controlling means, there is no appreciable waste of material and the amount of wire which is in each spring when the machine is once set for a particular type, is uniform, both in its proportions and in the length of wire used. This prevents the overhead waste which occurs in the use of the usual type of coilers and of knotters and insures uniformity of cost where the springs are made in large quantities.

Obviously changes in the detail of construction may be made without departing from the spirit of the invention and I do not care to limit myself to any particular form or arrangement of parts.

I claim as my invention:

1. A wire spring machine comprising wire coiling means, means for feeding wire thereto from a bundle and means actuated by the formed springs for compensating for variations in hardness and gauge of the stock, adapted to control the coiling means.

2. A wire spring machine comprising means for forming coil springs from wire fed thereto and knotting the ends to form closed end turns, means for supplying wire to the coiler and governing means actuated by the formed springs for controlling the coiler and maintaining uniformity in the springs.

3. A wire spring machine comprising coiling means, governing means actuated by the formed springs controlling the coiling means and shifting the latter automatically to maintain a predetermined pitch and size in the coil, means for feeding wire to the coiler and means for knotting the end turns of each coil delivered by the coiling means.

4. A wire spring machine comprising means for forming wire into coil springs with knotted ends, adjustable to make the coils of any pitch and diameter within the range of the mechanism and governing means actuated by the formed springs for compensating for variations in hardness and gauge of the stock adapted to control the coiling means.

5. A wire spring machine comprising a wire coiling means adapted to be varied while in operation to form wire into spring coils of any diameter and pitch within the range of the mechanism and governing means actuated by the formed springs adapted to control the coiling means and to compensate for variations in hardness and gauge of the stock.

6. A wire spring machine comprising wire coiling means, wire feeding means delivering to the coiling means and maintaining desired tension on the wire delivered and means governing the coiling means actuated by the formed springs for and compensating thereby for variations in hardness and gauge of the stock.

7. A wire spring machine comprising wire feeding means, wire coiling means, means actuated by the formed springs for governing the coiler for maintaining uniformity in the product and means for ejecting the springs from the machine.

8. A wire spring machine comprising means for forming wire into coil springs with knotted end loops, wire bale holder and feeding means for delivering wire to the coiling means, a governor, an automatic governing means actuated by the formed springs adapted to adjust the coiling means to compensate for variations in hardness and gauge of the stock and means for ejecting the springs from the machine.

9. A wire spring machine comprising wire coiling means for forming wire into coil springs with knotted ends automatically controlled by the formed springs to maintain the size and pitch of the springs, a bundle carrier and means for delivering the wire continuously from the bundle to the coiling means.

10. A wire spring machine comprising means for forming wire springs with tied end loops, adjustable to form springs any diameter and pitch within the range of the mechanism, governing means for the coiling means actuated by the formed springs adapted to maintain substantially constant proportions in the delivered springs, a bundle holder and wire feeding means adapted to deliver wire therefrom.

11. A wire spring machine comprising a coiler adjustable to form wire delivered thereto into wire springs of any desired pitch and diameter within the range of the machine, knotting means for tying one end loop of the wire spring, means for gripping the formed spring in the coiler while being severed from wire delivered to the coiler and for conveying the spring to and holding the same in operative relation to the knotter during the tying operation, means for knotting the other end loop of each spring, means for conveying the springs from the first knotter and presenting the same to the second knotter with the open end coils in operative relation to the latter knotting mechanism and means for ejecting the finished spring from the machine.

12. A wire spring making machine comprising means for knotting one end turn of a coil spring, means for forming a coil spring from a wire fed thereto and presenting the same in operative relation to the knotting means actuated by the formed springs, means for knotting the other end turn of the spring and means for transferring the springs from the first knotting means to the second.

13. A wire spring making machine comprising means for knotting an end turn of a coil spring, means actuated by the formed springs for forming spring coils from wire fed thereto and for presenting the same in definite operative relation to the knotting means, means for knotting the other end turn of the spring and means for delivering the springs from the first knotting means to the second in position for operation thereon.

14. A machine for making wire springs comprising means for knotting one end turn of a coil spring, means for knotting the other end turn of a coil spring, wire coiling means for forming spring coils and presenting them to one of the knotting means and means for transferring the springs from one knotting means to the other.

15. A machine for making wire springs, comprising means for knotting one end turn of a coil spring, means for knotting the other end turn of a coil spring, means for transferring a coil spring from one knotter to the other, coiling means for forming spring coils and presenting the same in definite relation to one of the knotting means and means for feeding wire from a stock bundle to the wire coiling means.

16. A wire spring making machine comprising means for knotting an end turn of a coil spring, means for knotting the other end turn of a coil spring, means for transferring a coil spring from one knotter to the other knotter, wire coiling means for forming and presenting wire springs to one of the knotters and governing means for the coiler adapted to control the proportions of the spring coils thereby.

17. A wire spring making machine comprising means for knotting the end turns of coiled springs, means for forming coiled springs from wire fed thereto and presenting them to the wire knotting means, means automatically controlling the wire coiling means actuated by the formed springs for maintaining the proportions of the springs formed thereby, means for feeding wire to the coiling means adapted to automatically maintain the desired tension upon the wire as it is fed and means for ejecting the springs.

18. A wire spring making machine comprising means for knotting one end turn of a coiled spring, means for knotting the other end turn of a coiled spring and means for transferring a spring from one knotter to the other in definite relation to the second knotting mechanism.

19. A wire spring making machine including means for knotting one end turn of a coiled spring, means for knotting the other end turn of a coiled spring and means for transferring the spring from one knotter to the other and presenting the spring in accurate register to the second knotter.

20. A wire spring making machine comprising a wire coiler adapted to form springs from wire delivered thereto, wire knotting means adapted to remove a spring formed by the coiler and to knot one end turn thereof, means for knotting the other end turn of the spring and means for delivering the spring from one knotter to the other in accurate register for the second operation.

21. A wire spring making machine comprising means for knotting one end turn of a wire spring, means for knotting the other end turn of a wire spring and transfer mechanism adapted to deliver a spring from one knotter to the other in accurate register with the latter knotter.

22. A wire spring making machine comprising wire coiling means adapted to form wire springs from wire fed to the coiler, means for gripping an end turn of a spring formed by the coiler and knotting the turn, means for knotting the other end turn of the spring and means for transferring the spring from one knotter to the other.

23. A wire spring making machine comprising coiling means, wire knotting means adapted to grip a spring formed by the coiler by one end turn thereof and to knot the turn, means for knotting the other end turn thereof and means for transferring the spring from one knotting means into registration with the second knotting means.

24. A wire spring making machine comprising wire coiling means, means automatically controlling the coiling means and regulating the proportion of the springs formed thereby, means for removing the spring formed by the coiler and knotting one end turn of each spring, means for knotting the other end turn of the spring, means for transferring the spring from one knotter into registration with the other knotter and means for ejecting the springs when fully knotted.

25. A wire spring making machine comprising wire coiling means, means for gripping the lower end turns of a spring formed by the coiler and knotting the turns, means for knotting the other end turns of the spring, and transferring means for inverting the spring delivered by the first knotter into registration with the second knotter.

26. In a wire spring making machine, wire coiling means including an angularly movable coiler block means for oscillating the block, and automatic means controlling and varying the range of movement of the coiler block.

27. In a wire spring making machine, an oscillating member for deflecting wire from its path, means for reciprocating this member, and means controlled by the wire after passing the deflector, for changing the range of movement of the member.

28. In a wire spring making machine, a coiler block pivoted to swing obliquely back and forth across the path of wire fed towards the block, an oscillating member articulated to the block to swing the latter, means actuated by the formed springs for shifting the point of connection with the oscillating member to vary the range of movement of the block and automatic means controlled by the wire deflected by coiler for varying this point of connection to change the range of motion of the block.

29. In a wire spring making machine, wire bundle reels, means for automatically shifting a loaded reel from bundle receiving to wire discharging position whenever the wire from a companion loaded reel is fully fed off therefrom, means for intermittently drawing wire from the reels, means for coiling the wire and severing each coil from the wire, automatic means controlled by the coiled wire for governing the coiling means, and means for knotting the end turns of the springs.

30. In a wire spring making machine, coiling means including a deflector, means for reciprocating the deflector across the path of the wire, governing means determining the range of movement of the deflector actuated by the wire delivered therefrom and means for severing and knotting wire coils formed by the deflector.

31. In a wire spring making machine, wire bundle holding means, wire coiling means, means for feeding wire from the holding means to the coiling means intermittently, means for severing the wire at the coiler when at rest, means for knotting an end turn of each coil when severed, means for knotting the other end turn of each coil, means for transferring each coil from one knotter into registration with the other knotter and means for operating these several means in timed relation.

32. In a wire spring making machine, a reel holder, means for swinging the holder to bring a reel from loading to delivery position, means controlled by wire leaving a reel on the holder and adapted to throw the holder swinging means into action, when the wire is exhausted from a reel, means for coiling wire, means for feeding wire intermittently to the coiling means from the reel holder, means for severing the spring coils from the wire at the coiler, during each period of rest of the feeding means, means for knotting the end turns of the coils, and means for operating the several means in co-ordination.

33. In a wire spring making machine, coiling means, means for compressing the coiled spring, means for knotting both end turns and means actuated by the formed springs for regulating and controlling the coiling means, to produce springs of predetermined proportions.

34. In a wire spring making machine, coiling means adjustable to produce springs of desired proportions, means actuated by the formed springs for adjusting the coiling means while operating, to vary the proportions of the springs, and means for knotting the end turns of the coiled springs.

35. In a wire spring making machine, coiling means, means actuated by the formed springs for adjusting the coiling means while in operation, to vary the proportions of the produced springs, means for throwing the adjusting means into action, and means for knotting the end turns of the springs.

36. In a wire spring making machine, coiling means, means for adjusting the coiling means while in operation to vary the proportions of the produced springs, means controlled by the produced spring for throwing the adjusting means into action, and means for knotting the end turns of the springs.

37. In a wire spring making machine, coiling means, means for adjusting the coiling means to vary the proportions of the produced springs, adapted to be thrown into action by the coiled wire when the latter deviates from a predetermined path, and means for knotting the end turns of the springs.

38. In a wire spring making machine, means for drawing wire from a mill bundle and projecting it in the direction of its length, coiling means for deflecting the projected wire into coils, adjustable to vary the proportions of the coils, adjusting means for shifting the coiling means while the latter is operating, controlled by the formed springs, and means for knotting the end turns of the coil springs.

39. In a wire spring making machine, means for drawing wire from a mill bundle and projecting it in the direction of its length, coiling means for deflecting the projected wire into coils, adjustable to vary the proportions of the coils, automatic adjusting means for shifting the coiling means while the latter is operating, controlled by the formed springs, and means controlled by the deflected wire for throwing the adjusting means into action whenever the coiled wire deviates from a predetermined path.

40. In a wire spring making machine, means for projecting wire in the direction of its length, angularly adjustable deflecting coiling means oscillating in the path of the wire, means for varying the range and degree of oscillations of the coiling means, adapted to be thrown into action by deviations of the wire from a predetermined course after leaving the coiling means, and means for knotting the coiled springs.

41. In a wire spring making machine, means for projecting wire in the direction of its length, deflecting coiling means in the path of the projected wire, means for oscillating the deflecting means adjustable to vary the range of oscillations, means for operating these several means in timed relation and means for adjusting the oscillating means adapted to be driven by the operating means.

42. In a wire spring making machine, means for projecting wire in the direction of its length, deflecting coiling means in the path of the projected wire, means for oscillating the deflecting means adjustable to vary the range of oscillation, means for operating these several means in timed relation, means adapted to be driven by the operating means for adjusting the oscillating means and means for throwing the adjusting means into connection with the operating means.

43. In a wire spring making machine, means for projecting wire in the direction of its length, deflecting coiling means in the path of the projected wire, means for operating the coiling means adjustable to vary the range of action of the coiling means, means for driving the several means in timed relation, means for adjusting the coiling means adapted to be operated by the driving means and means energized by the deflected wire whenever the latter leaves a predetermined path for throwing the adjusting means into connection with the driving means.

44. In a structure of the class described, the combination of a coiling means, first and second knotters, means actuated by the formed springs for transferring the springs from the coiling means to the first knotter, a positioning means, means for transferring the spring from the first knotter to the positioning means, and means for transferring the spring from the positioning means to the second knotter adapted to invert the springs.

45. In a structure of the class described, the combination of a coiling means, first and second knotters, means for transferring the springs from the coiling means to the first knotter, a positioning means, means for transferring the spring from the first knotter to the positioning means, and means for transferring the spring from the positioning means to the second knotter.

46. A coiling machine comprising a coiler, a knotter, means for transferring the spring from the coiler to said knotter and supporting it while in said knotter in upright position, a positioning means, means for inverting and transferring the spring from the said positioning means to the second knotter, and means for ejecting the finished spring from the second knotter.

47. A coiling machine comprising a coiler, a knotter, means for transferring the spring from the coiler to said knotter and supporting it while in said knotter in upright position, a positioning means, and means for inverting and transferring the spring from the said positioning means to the second knotter.

48. A coiling machine comprising a coiler adjustable to form wire delivered thereto into coils of desired pitch and diameter within the range of the machine, an automatic governing means for the coiler controlled by the formed springs, first and second knotters, means for transferring the formed springs from the coiler to the first knotter in different relation thereto, and means for transferring the springs from the first knotter to the second knotter.

49. A coiling machine comprising a coiler, a knotting means, means for engaging the bottom and an adjacent coil of the spring while in the coiler and prior to its being severed from the stock and for conveying the spring to and holding the same in definite operative relation to the knotter during the knotting operation, a second knotter, and means for conveying the springs from the first knotter and presenting the same to the second knotter with the open end coils in definite operative relation thereto.

50. A coiling machine comprising a coiler adjustable to form wire delivered thereto into coils of desired pitch and diameter within the range of the machine, an automatic governing means for the coiler controlled by the formed springs, a knotter, and means for transferring the formed springs to the knotter in definite relation thereto.

51. The combination with a coiler mechanism, means for feeding wire to the coiler mechanism from a bale of wire, means for severing the formed springs from the stock, a knotter, and a transfer means for delivering the spring from the coiler to the knotter adapted to grip the bottom coil and the adjacent coil of the spring prior to the severing thereof from the stock and presenting the same in definate relation to the knotter.

52. The combination with a coiler mechanism, means for intermittently feeding wire to the coiler mechanism, means for severing the formed spring from the stock while in the coiler and during periods of rest of the feeding means, a knotter, and a transfer means for delivering the spring from the coiler to the knotter adapted to grip the bottom coil and the adjacent coil of the spring and presenting the same in definite relation to the knotter.

53. The combination with a coiler mechanism, means for feeding wire to the coiler mechanism, means for severing the formed spring from the stock, a knotter, and a transfer means for delivering the spring from the coiler to the knotter adapted to grip the formed spring prior to its being severed from the stock.

54. A coiling machine comprising a coiler, a knotting means, means for engaging the bottom and an adjacent coil of the spring while in the coiler and prior to its being severed from the stock and for conveying the spring to and holding the same in definite operative relation to the knotter during the knotting operation.

55. A coiling machine comprising a coiler adjustable to form wire delivered thereto into coils of desired pitch and diameter within the range of the machine, and an automatic governing means for the coiler controlled by the formed springs.

56. In a structure of the class described, the combination of an intermittently acting wire feed means, a coiler block movable to vary the diameter of the coils, and an automatically acting governing means for varying the throw of the coiler block controlled by the formed springs and acting during the pauses of said feed means.

57. In a structure of the class described, the combination of a coiler block, a coil testing means, a coiler block actuating means, and a governor for said coiler block actuating means operatively associated with said testing means.

58. In a structure of the class described, the combination of a coiler member, a spring testing means, a coiler member actuating means, and a governor for said actuating means operatively associated with and controlled by said testing means.

59. In a structure of the class described, the combination of a movable coiler member, means for varying the stroke of said coiler member including a governor, and a testing means controlling the said governor.

60. In a structure of the class described, the combination of a movable coiler member, an actuating means therefor automatically adjustable to vary the throw of the coiler member, and means for effecting such adjustment controlled by the formed springs.

61. In a structure of the class described, the combination of a movable coiler member, and a governor, and means for controlling said coiler member controlled by the formed springs.

62. In a structure of the class described, the combination of a coiler block movable to vary the diameter of the coils, means for actuating said coiler block, and an automatically acting governing means for varying the throw of the coiler block controlled by the formed springs.

63. In a structure of the class described, the combination with a knotter, coiling means for forming the springs, means for feeding wire from a stock bundle to the coiling means, means actuated by the formed springs for controlling the coiling means for maintaining dimensions of the springs, and means for transferring the coiled springs from the coiling means to the knotter.

64. In a structure of the class described, the combination with a wire coiling means, a governing means therefor for automatically maintaining the proportion of the formed springs and actuated by the formed springs, means for delivering wire to the coiling means from a stock bundle, means for knotting both end turns of the spring formed by the coiler, and transfer means between the coilers and knotters.

65. A wire spring making machine comprising means for knotting the end turns of coiled springs, means for forming coiled springs from wire fed continuously thereto and presenting them to the wire knotting means, means automatically controlling the wire coiling means for maintaining the proportions of the springs formed thereby, means for feeding wire to the coiling means adapted to automatically maintain the desired tension upon the wire as it is fed.

66. In a structure of the class described, the combination of an intermittently acting wire feed means, a movable coiler member, means for actuating said coiler member, an electrically actuated governor means therefor, and a control for said governor means comprising a testing means.

67. In a structure of the class described, the combination of a movable coiler member, and means for controlling said coiler member including an electrically actuated governor controlled by the formed springs.

68. In a structure of the class described, the combination of a transfer member comprising an arm pivoted for oscillating movement, a segment pivotally mounted on said arm and having a gripper mounted thereon, a coacting pivotally mounted gripper, a segmental rack with which said segment on said arm coacts at one period during the swinging movement of the arm whereby the grippers are swung upon the arm, a spring acting to normally swing said movable gripper to open position, a reciprocating member for closing said gripper against the tension of said spring, and means for swinging said arm and actuating said gripper closing member.

69. In a structure of the class described, the combination of a transfer member comprising an arm pivoted for oscillating movement, a segment pivotally mounted on said arm and having a gripper mounted thereon, a coacting pivotally mounted gripper, a segmental rack with which said segment on said arm coacts at one period during the swinging movement of the arm whereby the grippers are swung upon the arm, and means for swinging said arm and opening and closing said grippers.

In testimony whereof I affix my signature.

BERT L. VAN ORMAN.